United States Patent
Rashidy et al.

(10) Patent No.: US 7,413,240 B2
(45) Date of Patent: Aug. 19, 2008

(54) STRUCTURAL SYSTEM FOR A CONVERTIBLE AUTOMOTIVE VEHICLE

(75) Inventors: Mostafa Rashidy, West Bloomfield, MI (US); George Wolenter, Dearborn Heights, MI (US); Robert G. Storc, Rochester Hills, MI (US); James E. Robertson, Rochester, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 363 days.

(21) Appl. No.: 10/979,873

(22) Filed: Nov. 2, 2004

(65) Prior Publication Data

US 2005/0134091 A1    Jun. 23, 2005

Related U.S. Application Data

(63) Continuation-in-part of application No. 10/822,901, filed on Apr. 13, 2004.

(60) Provisional application No. 60/499,669, filed on Sep. 3, 2003.

(51) Int. Cl.
*B60J 7/00* (2006.01)
(52) U.S. Cl. .............................. 296/187.12; 296/193.02
(58) Field of Classification Search ............ 296/187.12, 296/193.02, 187.08, 187.03, 203.01, 205
See application file for complete search history.

(56) References Cited

U.S. PATENT DOCUMENTS

| | | | |
|---|---|---|---|
| 1,463,193 A | 7/1923 | Botella | |
| 1,694,546 A | 12/1928 | Lancia | |
| 1,794,465 A | 3/1931 | Ledwinka | |
| 1,797,989 A | 3/1931 | Ledwinka | |
| 2,079,232 A | 5/1937 | Smith | |
| 2,370,211 A | 2/1945 | Ulrich | |
| 2,597,837 A | 5/1952 | Lindsay | |
| 2,751,247 A | 6/1956 | Barenyi | |
| 3,021,172 A | 2/1962 | Fiala et al. | |
| 3,328,935 A | 7/1967 | Peras | |
| 3,944,276 A | 3/1976 | de Rosa et al. | |
| 4,230,361 A | 10/1980 | Nachbur et al. | |
| 4,231,607 A | 11/1980 | Bohlin | |
| 4,346,930 A | 8/1982 | Northey | |

(Continued)

FOREIGN PATENT DOCUMENTS

AU    655 926 B    1/1996

(Continued)

OTHER PUBLICATIONS

Photograhs of 1942 Rolls-Royce, "Duchess" Fleetwood sedan with stationary roof (believed to have been offered for sale or publically used in 1942).

(Continued)

*Primary Examiner*—Joseph D. Pape
(74) *Attorney, Agent, or Firm*—Harness, Dickey & Pierce, P.L.C.

(57) ABSTRACT

A structural reinforcement system is provided for an automotive vehicle. In another aspect of the present invention, a structural beam is employed which extends in a cross-vehicle direction spaced above a vehicle floor. A further aspect of the present invention provides a cross-vehicle reinforcement beam inside another structural member. Yet another aspect of the present invention uses a structural reinforcement system in a convertible roof vehicle.

54 Claims, 38 Drawing Sheets

U.S. PATENT DOCUMENTS

| | | | |
|---|---|---|---|
| 4,493,506 A | 1/1985 | Alexander |
| 4,514,891 A | 5/1985 | Draper |
| 4,570,321 A | 2/1986 | Draper |
| 4,613,184 A | 9/1986 | Rispeter et al. |
| 4,660,345 A | 4/1987 | Browning |
| 4,662,052 A | 5/1987 | Draper |
| 4,729,156 A | 3/1988 | Norris, Jr. et al. |
| 4,892,350 A | 1/1990 | Kijima |
| 4,934,751 A | 6/1990 | Shimoda |
| 4,940,282 A | 7/1990 | Townsend |
| 4,944,553 A | 7/1990 | Medley et al. |
| 4,950,026 A | 8/1990 | Emmons |
| 4,968,087 A | 11/1990 | Goria |
| 5,018,780 A | 5/1991 | Yoshii et al. |
| 5,020,846 A | 6/1991 | Bonnett |
| 5,094,478 A | 3/1992 | Pfanzeder et al. |
| 5,110,176 A | 5/1992 | Curtis |
| 5,194,199 A | 3/1993 | Thum |
| 5,238,286 A | 8/1993 | Tanaka et al. |
| 5,255,487 A | 10/1993 | Wieting et al. |
| 5,351,400 A | 10/1994 | Samuel |
| 5,388,885 A | 2/1995 | Warren |
| 5,435,618 A | 7/1995 | Sacco et al. |
| 5,575,531 A | 11/1996 | Gauger et al. |
| 5,577,796 A | 11/1996 | Clausen |
| 5,577,797 A | 11/1996 | Takanishi |
| 5,584,525 A | 12/1996 | Nakano et al. |
| 5,613,727 A | 3/1997 | Yamazaki |
| 5,641,193 A | 6/1997 | Zepnik et al. |
| 5,641,194 A | 6/1997 | Honma et al. |
| 5,772,274 A | 6/1998 | Tokarz |
| 5,788,322 A | 8/1998 | Wolf et al. |
| 5,803,533 A | 9/1998 | Schulz et al. |
| 5,806,918 A | 9/1998 | Kanazawa |
| 5,868,426 A | 2/1999 | Edwards et al. |
| 5,881,458 A | 3/1999 | Wolf et al. |
| 5,921,618 A | 7/1999 | Mori et al. |
| 5,954,390 A | 9/1999 | Kleinhoffer et al. |
| 5,988,734 A | 11/1999 | Longo et al. |
| 5,992,921 A | 11/1999 | Seki |
| 5,997,078 A | 12/1999 | Beck et al. |
| 6,007,145 A | 12/1999 | Tezuka |
| 6,039,386 A | 3/2000 | Hasshi et al. |
| 6,053,567 A | 4/2000 | Ito |
| 6,126,232 A | 10/2000 | Nakano |
| 6,139,082 A | 10/2000 | Davis, Jr. et al. |
| 6,168,228 B1 | 1/2001 | Heinz et al. |
| 6,176,544 B1 | 1/2001 | Seksaria et al. |
| 6,189,952 B1 | 2/2001 | Schmidt et al. |
| 6,193,306 B1 | 2/2001 | Lee |
| 6,220,654 B1 | 4/2001 | Sommer |
| 6,237,991 B1 | 5/2001 | Weber |
| 6,270,153 B1 | 8/2001 | Toyao et al. |
| 6,273,498 B1 | 8/2001 | Hillman et al. |
| 6,296,301 B1 | 10/2001 | Schroeder et al. |
| 6,299,238 B1 | 10/2001 | Takagi et al. |
| 6,299,239 B1 | 10/2001 | Sagawa et al. |
| 6,299,240 B1 | 10/2001 | Schroeder et al. |
| 6,315,353 B1 | 11/2001 | Brodt et al. |
| 6,332,643 B1 | 12/2001 | Sukegawa et al. |
| 6,382,710 B1 | 5/2002 | Funk et al. |
| 6,398,292 B2 | 6/2002 | Tsuruta et al. |
| 6,434,907 B1 | 8/2002 | Simboli |
| 6,443,517 B1 | 9/2002 | Just et al. |
| 6,443,518 B1 | 9/2002 | Rohl et al. |
| 6,491,337 B2 | 12/2002 | Averdick et al. |
| 6,540,286 B2 | 4/2003 | Takemoto et al. |
| 6,568,745 B2 | 5/2003 | Kosuge et al. |
| 6,572,181 B2 | 6/2003 | Jonsson |
| 6,578,903 B2 | 6/2003 | Ernst et al. |
| 6,604,781 B2 | 8/2003 | Uchida |
| 6,644,725 B2 | 11/2003 | Braitmaier et al. |
| 6,655,729 B2 | 12/2003 | Neale |
| 6,666,500 B2 | 12/2003 | Polzer et al. |
| 6,679,546 B2 | 1/2004 | Mishima et al. |
| 6,688,677 B2 | 2/2004 | Glashagel et al. |
| 6,857,692 B2 | 2/2005 | Cardimen et al. |
| 6,869,132 B2 | 3/2005 | Wang et al. |
| 2001/0019216 A1 | 9/2001 | Kobayashi |
| 2001/0045759 A1 | 11/2001 | Russke |
| 2002/0057004 A1 | 5/2002 | Corcoran et al. |
| 2002/0145307 A1 | 10/2002 | Fujita |
| 2002/0153749 A1 | 10/2002 | Lee |
| 2002/0163225 A1 | 11/2002 | Glashagel et al. |
| 2002/0195840 A1 | 12/2002 | Mishima et al. |
| 2003/0006629 A1 | 1/2003 | Kimura et al. |
| 2003/0034671 A1 | 2/2003 | Streiff et al. |
| 2003/0038498 A1 | 2/2003 | Rajasingham |
| 2003/0062742 A1 | 4/2003 | Neale |
| 2004/0222658 A1 | 11/2004 | Dilluvio |
| 2005/0057077 A1 | 3/2005 | Telehowski et al. |

FOREIGN PATENT DOCUMENTS

| | | |
|---|---|---|
| CA | 2 403 319 | 3/2003 |
| DE | 196 03 098 A1 | 7/1997 |
| DE | 199 16 849 | 10/2000 |
| EP | 0 059 147 | 5/1985 |
| EP | 0 934 865 | 8/1999 |
| EP | 1 151 882 | 11/2001 |
| FR | 459931 | 11/1913 |
| FR | 671743 | 12/1929 |
| FR | 2 120 326 A | 8/1972 |
| FR | 2 698 600 | 6/1994 |
| GB | 273894 | 7/1927 |
| GB | 612015 | 11/1948 |
| JP | 6-99851 | 4/1994 |
| JP | 11-115662 | 4/1999 |
| JP | 11-129368 | 5/1999 |
| WO | WO 02/096675 | 12/2002 |
| WO | WO 03/031746 | 4/2003 |

OTHER PUBLICATIONS

Photographs of 1931 Series 355 7-passenger touring vehicle with convertible roof and four doors (believed to have been offered for sale or publically used in 1931).

Photos and description of Kennedy Presidential Limousine (publicly used in 1960s).

G. Guzzardi and E. Rizzo, Convertibles—History and Evolution of Dream Cars (1998), 38 pages.

Two photographs of 2005 Ford 500.

Photograph of Rolls Royce (publicly used or published in 1956).

Photographs of Lincoln Continental Limousine (publicly used or published prior to 2003).

Photographs of metal structure for 2005 model year Ford 500 (2 pages).

Mark Vaughn, "Chrysler 300C Cabriolet", (Newport Convertible Engineering, Inc.), Nov. 22, 2004, AutoWeek, p. 4.

"Drop-top Rolls", Nov. 22, 2004, AutoWeek, p. 4.

European Search Report dated Aug. 2, 2005.

Byron Bloch, Advanced Designs for Side Impact and Rollover Protection, 1998, 15 pages.

European Search Report dated Nov. 15, 2007, 7 pages.

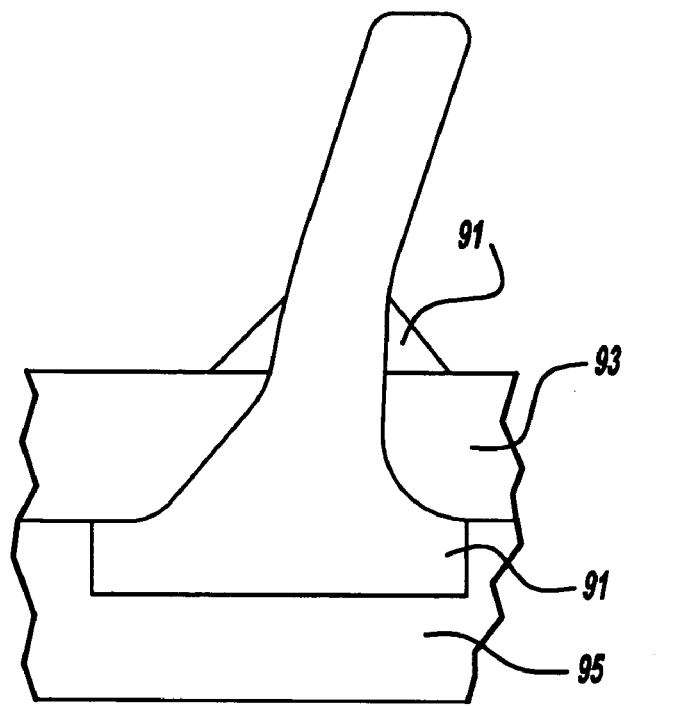
FIG - 5
FIG - 6
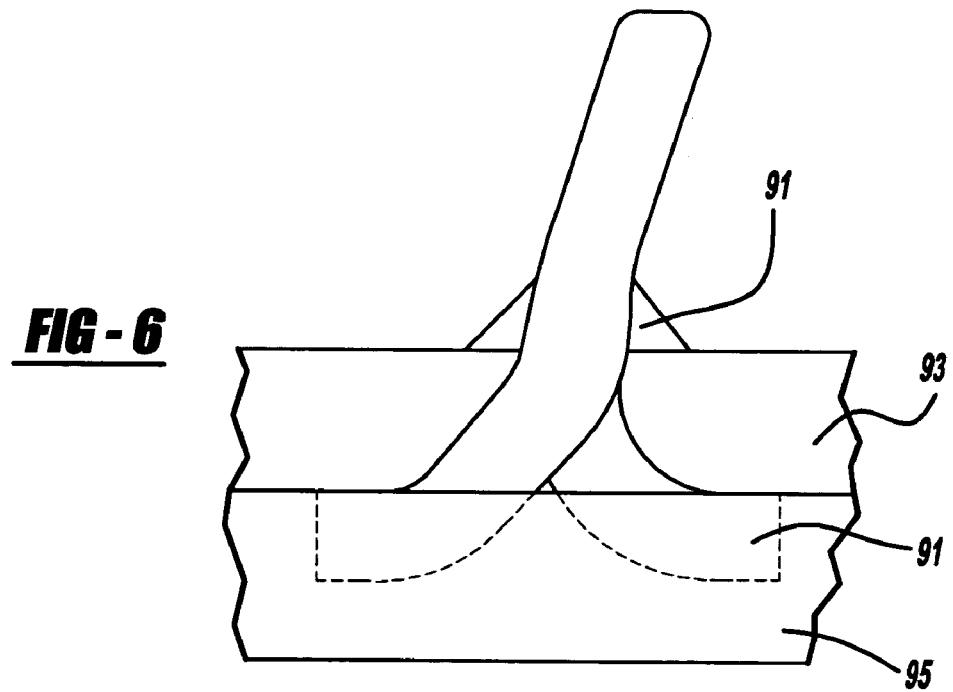

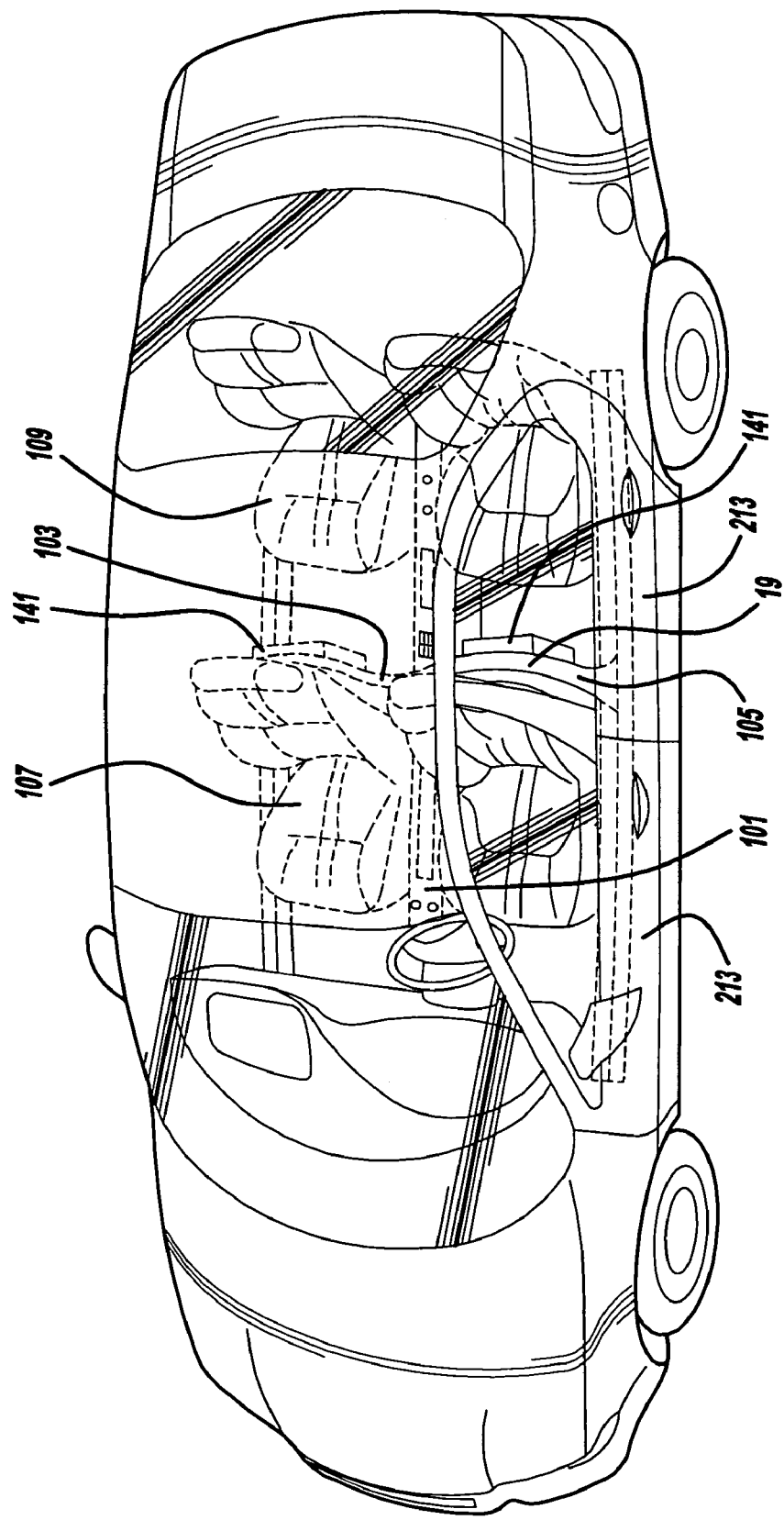

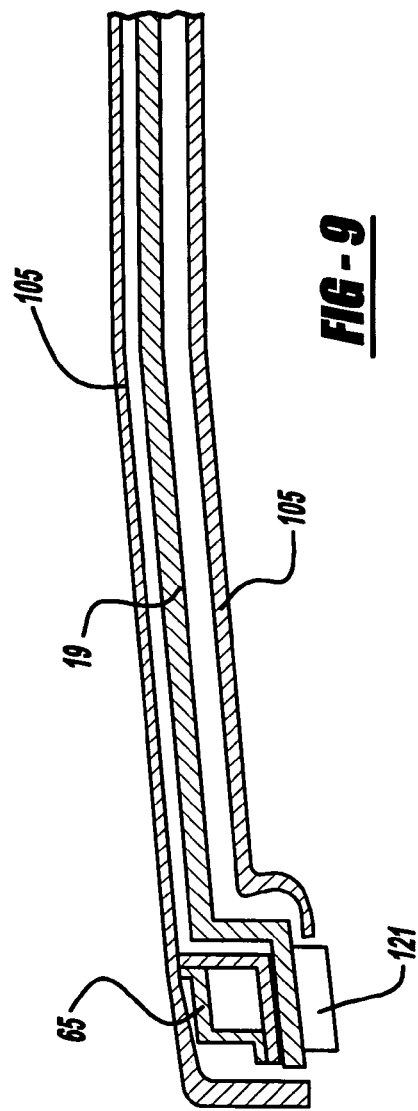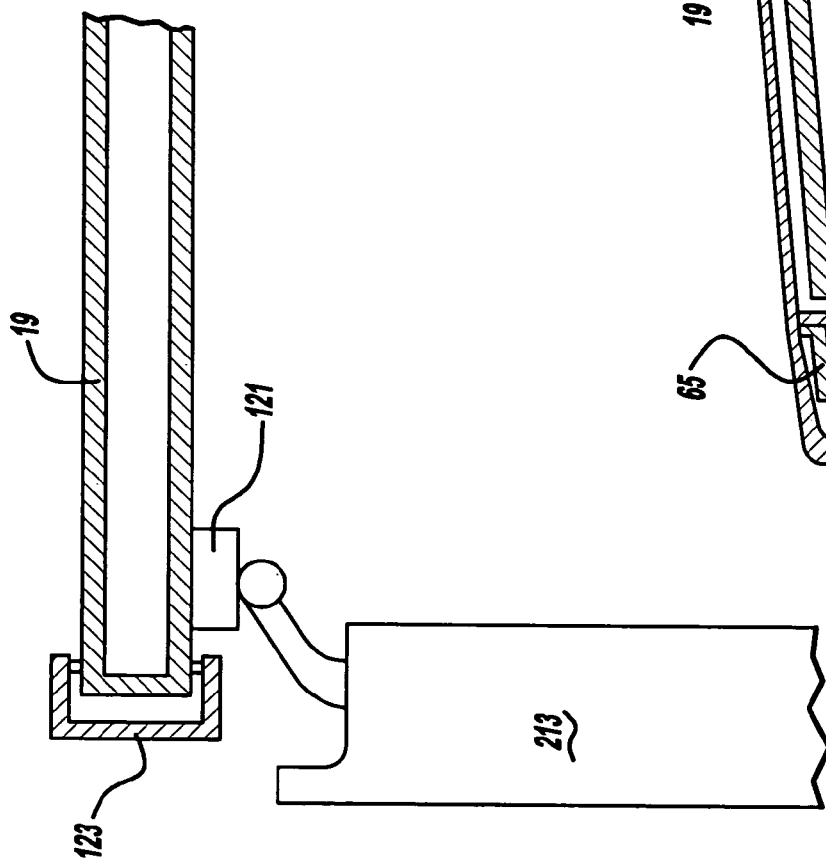

STRUCTURAL SYSTEM FOR A CONVERTIBLE AUTOMOTIVE VEHICLE

CROSS-REFERENCE TO RELATED APPLICATIONS

This application is a continuation-in-part of copending U.S. Ser. No. 10/822,901, filed on Apr. 13, 2004, which claims the benefit of U.S. Provisional Application No. 60/499,669, filed on Sep. 3, 2003. The disclosures of the above applications are incorporated by reference herein.

BACKGROUND AND SUMMARY OF THE INVENTION

The present invention generally relates to automotive vehicle structure and more particularly to a cross-vehicle structural reinforcement for an automotive vehicle.

Cross-vehicle body stiffness within automotive vehicles is important in reducing torsional twist and vibration of the body, but also improves the ride and handling of the vehicle. This issue is especially important for convertible vehicles where the removal of the traditional fixed roof structure further decreases vehicle stiffness to the point where four door convertible roof vehicles have been essentially impractical to achieve with conventional body structure. Furthermore, U.S. Federal Motor Vehicle Safety Standard ("FMVSS") 214 relates to side impact collision protection for vehicles. This governmental standard employs a moving barrier, equivalent to a truck bumper, which impacts the vehicle generally at and below a belt-line of the front door and B-pillar. FMVSS 214 puts an added premium on cross-vehicle stiffness.

U.S. Pat. No. 1,694,546 entitled "Motor Car," which issued to Lancia on Dec. 11, 1928, and U.S. Pat. No. 5,788,322 entitled "Body Structure for a Rear Carriage of a Convertible," which issued to Wolf et al. on Aug. 4, 1998, have both attempted to provide some cross-vehicle structure. It is noteworthy, however, that both constructions are attached to a fixed seat back and/or passenger compartment panel. Furthermore, the Lancia construction appears to lack any cross-vehicle structural support that would significantly resist side impacts or torsion, especially for a modern unibody construction vehicle.

In accordance with the present invention, a structural reinforcement system is provided for an automotive vehicle. In another aspect of the present invention, a structural beam is employed which extends in a cross-vehicle direction spaced above a vehicle floor. A further aspect of the present invention provides a cross-vehicle reinforcement beam inside another structural member. A variety of structural beam-to-pillar mounting arrangements are also provided in additional aspects of the present invention. Yet another aspect of the present invention uses a structural reinforcement system in a convertible roof vehicle.

The present invention is advantageous over conventional constructions, in that the present invention significantly improves cross-vehicle resistance to side impact collisions and provides torsional stiffness sufficient for use with a large four door vehicle, such as one having a convertible roof. Spacing the structural beam away from the floor reduces "match boxing" of the vehicle body as compared to traditional, floor mounted reinforcements. Moreover, the beam-to-pillar mounting structures of the present invention significantly enhance side impact resistance as compared to prior constructions. Additional features and advantages of the present invention will be shown and described with reference to the following description and appended figures.

BRIEF DESCRIPTION OF THE DRAWINGS

FIG. 5 is a diagrammatic side view showing a first alternate embodiment structural reinforcement system made by stamping;

FIG. 6 is a diagrammatic side view showing a second alternate embodiment structural reinforcement system made by hydroforming;

FIG. 7 is a perspective view showing a fragmentary third alternate embodiment automotive vehicle employing a structural reinforcement system of the present invention;

FIG. 8 is a diagrammatic, partially cross-sectional view, taken along line 8-8 of FIG. 4, showing the second alternate embodiment structural reinforcement system;

FIG. 9 is a diagrammatic, cross-sectional view, taken along line 8-8 of FIG. 4, showing the first alternate embodiment structural reinforcement system;

DETAILED DESCRIPTION OF THE PREFERRED EMBODIMENTS

Figure 1:
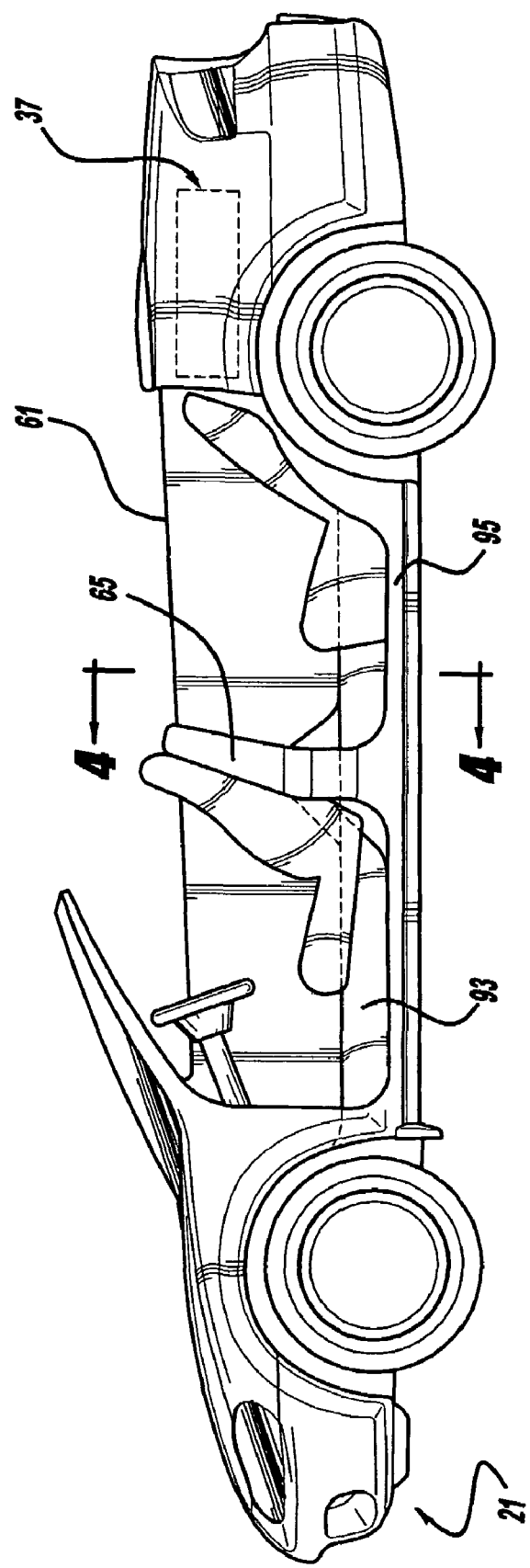
FIG. 1 is a side elevational view showing an alternate embodiment automotive vehicle employing a structural reinforcement system of the present invention, with a hard-top convertible roof in a retracted position and with the left side doors removed.
Figure 2:
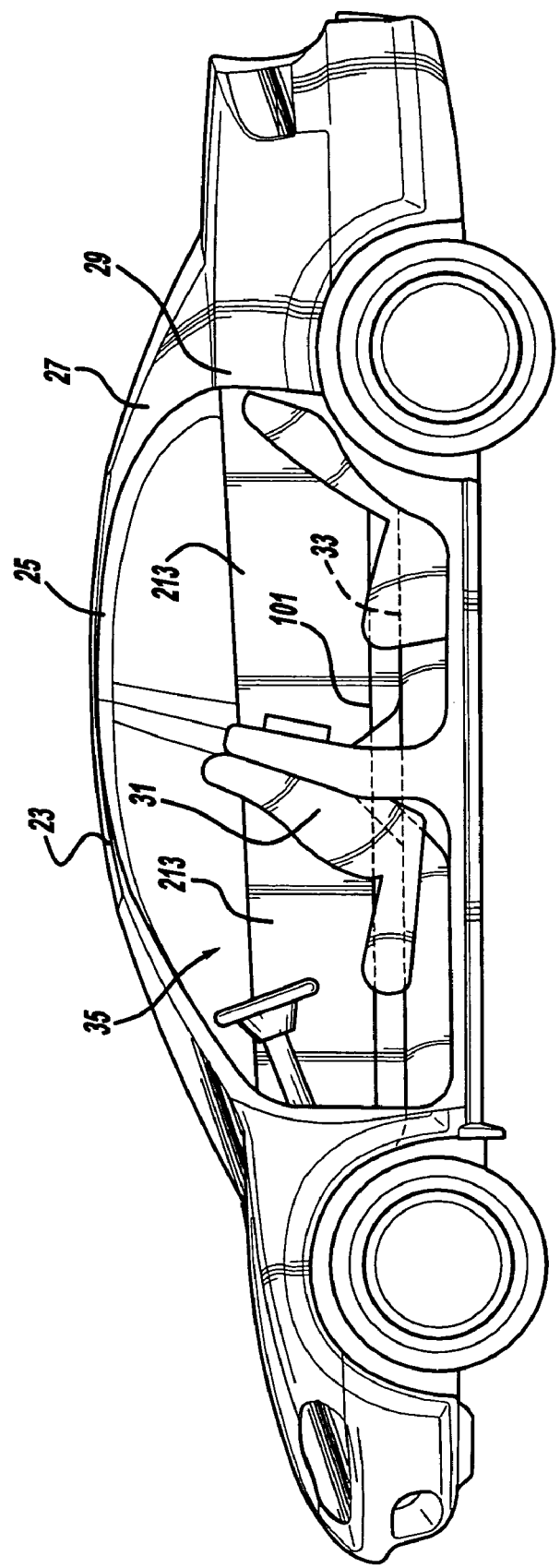
FIG. 2 is a side elevational view showing an alternate embodiment automotive vehicle employing a structural reinforcement system, with the hard-top convertible roof in a raised position and with the left side doors removed.

An automotive vehicle according to the present invention has a body, a convertible roof and a structural reinforcement system 19. In an alternate embodiment of vehicle 21, shown in FIGS. 1 and 2, the convertible roof is a retractable hard-top roof including a front hard-top section 23, a middle hard-top section 25 and a rear hard-top section 27. The hard-top sections are interconnected by a linkage assembly (not shown) driven by an automatic actuator 29, such as an electric motor or hydraulic cylinder. The convertible roof is movable from a raised and closed position above front passenger seats 31 and rear passenger seats 33 in a passenger compartment 35, as shown in FIG. 2, to a retracted and open position within a roof storage compartment 37, as shown in FIG. 1. Roof storage compartment 32 is a trunk with a dual opening decklid, or a bootwall, forward and separated from a trunk, covered by an automatically openable tonneau cover. Such a hard-top roof and linkage assembly is disclosed in U.S. patent application Ser. No. 10/245,973, now U.S. Pat. No. 6,695,386, entitled "Vehicle Retractable Hardtop Roof," which was invented by Michael T. Willard and filed on Sep. 18, 2002, which is incorporated by reference herein.

Figure 3:
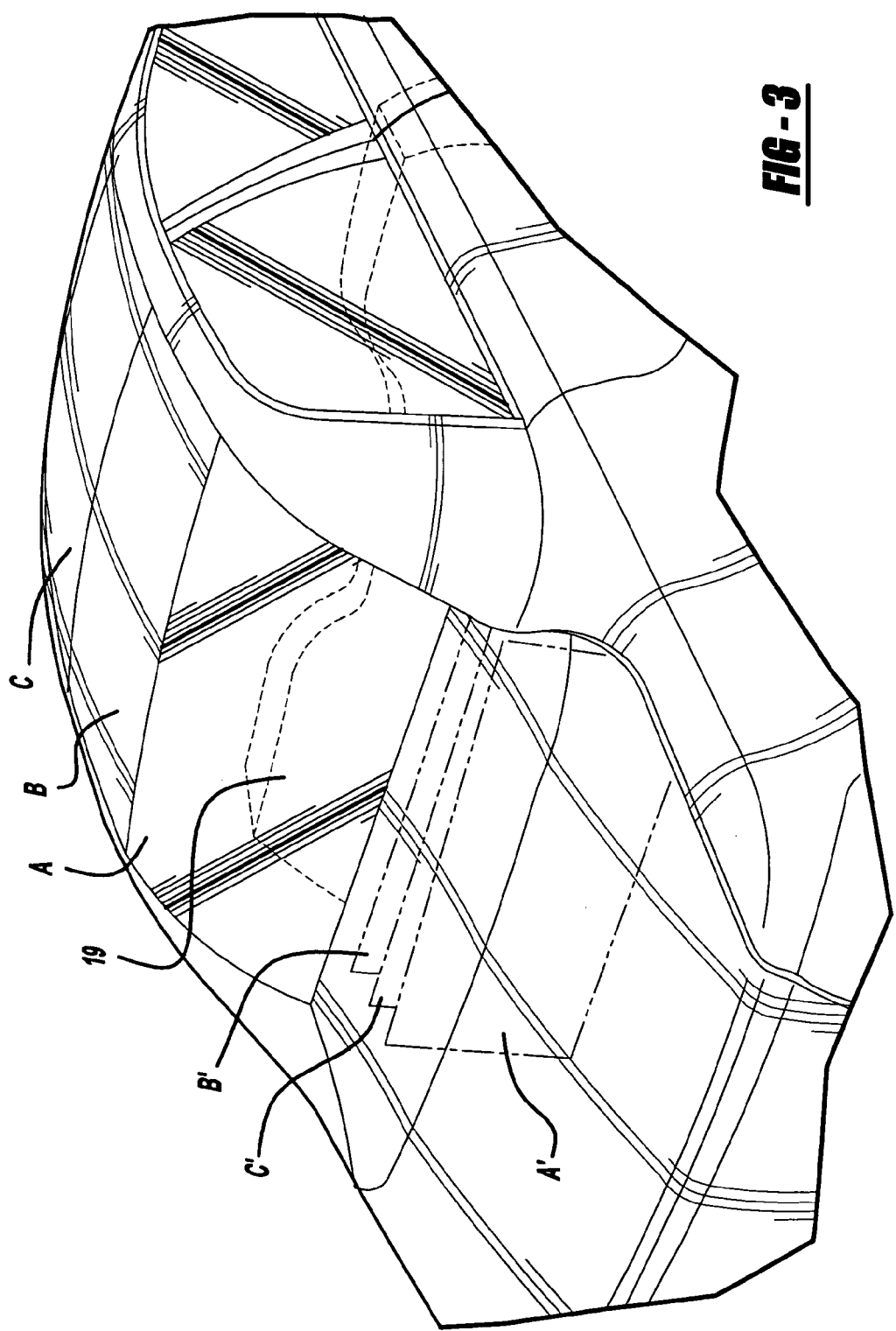
FIG. 3 is a perspective view as seen from behind the right rear corner, showing an alternate embodiment automotive vehicle employing a structure reinforcement system of the present invention, with a slidably retracting roof in a raised position.
Figure 18:
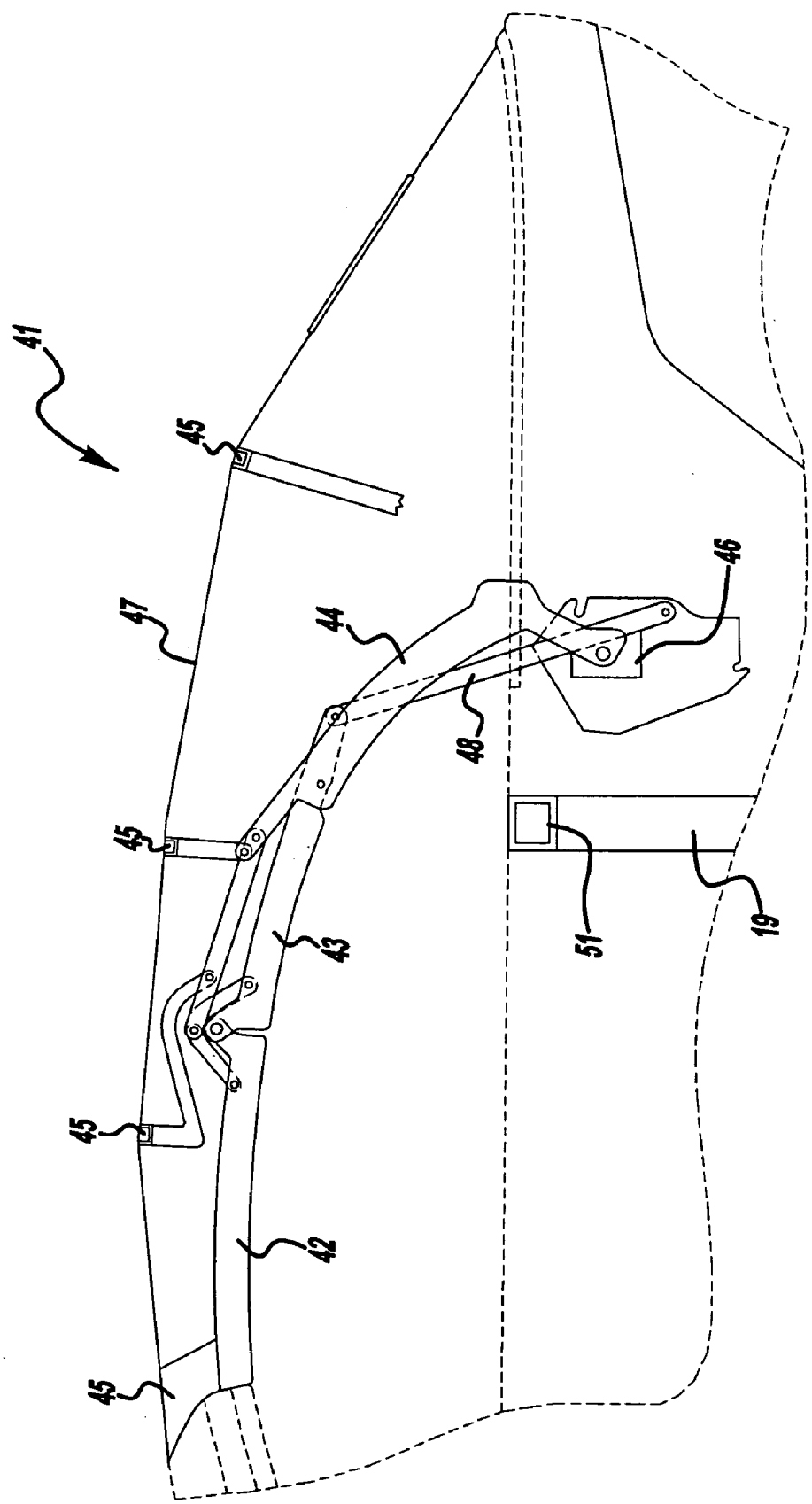
FIG. 18 is a diagrammatic, perspective view showing another alternate embodiment system of the present invention but with a soft top convertible roof.

Referring to FIG. 18, a soft top convertible roof 41 is also usable with the present invention, and is disclosed in U.S. patent application Ser. No. 10/403,362, now U.S. Pat. No. 6,695,385, entitled "Vehicle Convertible Roof," which was invented by Eric W. Lange and filed on Mar. 31, 2003; this disclosure is incorporated by reference herein. Soft top roof 41 includes a top stack mechanism including left and right, front, center and rear side rails, 42, 43 and 44, respectively, with four spanning roof bows 45 and multiple linkages 48. An electric motor or hydraulic actuator 46 automatically drives the mechanism and a pliable roof cover 47 is attached to and covers roof bows 45. More preferably, an in-folding soft top convertible roof is employed, such as that disclosed in U.S. application Ser. No. 60/612,384, entitled "In-Folding Convertible Roof" which was filed on Sep. 23, 2004, and invented by Dilluvio; this application is incorporated by reference herein. Furthermore, FIG. 3 shows multiple sliding roof panels and a slidably retracting backlite or back window, which are employed with the present invention in another alternate embodiment. This is disclosed in PCT Publication No. WO 02/096685 entitled "Automotive Vehicle with Open Air System" which was invented by Doncov et al. and published on Dec. 5, 2002; this disclosure is also incorporated by reference herein.

Figure 4:
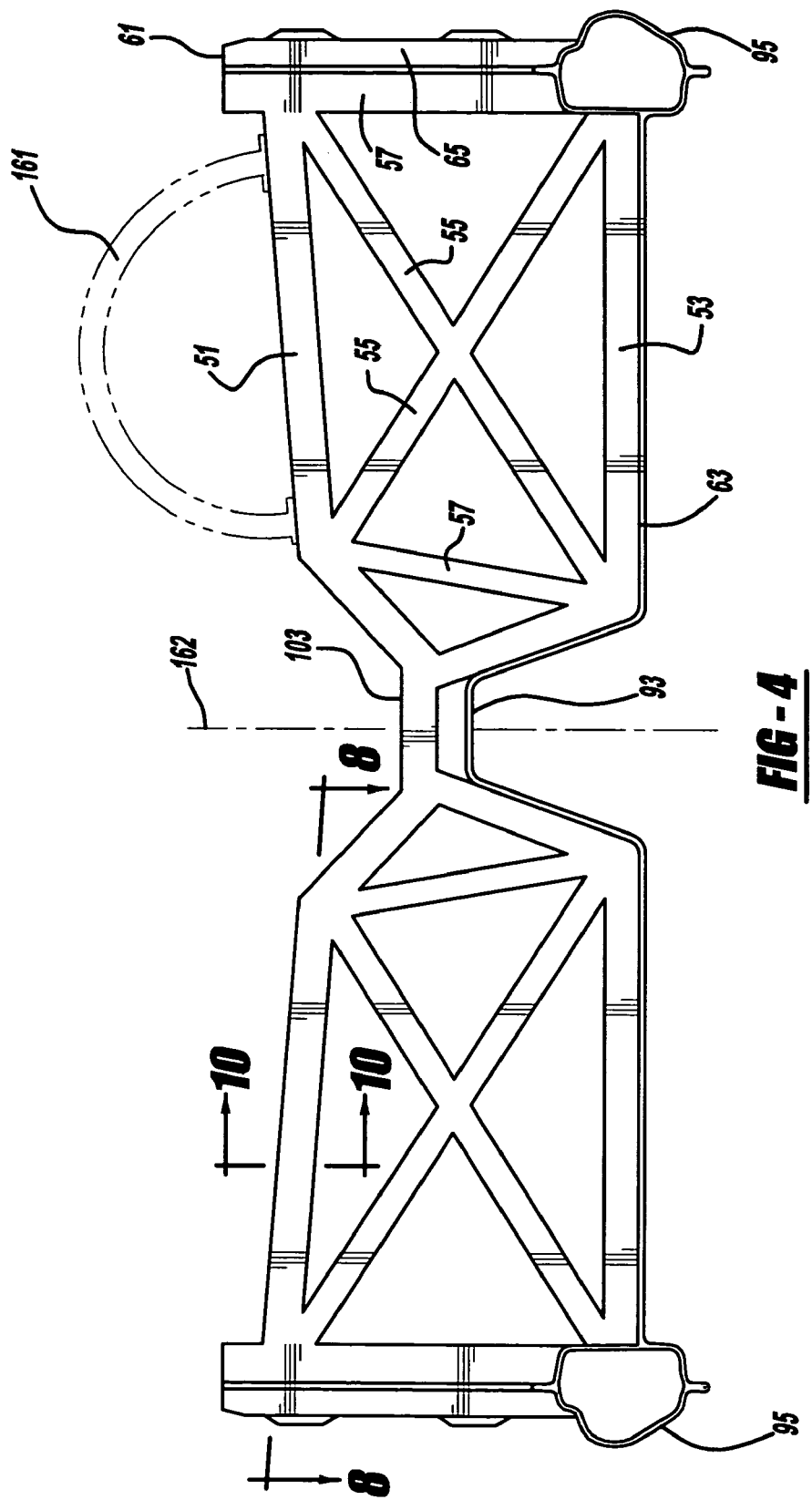
FIG. 4 is a partially fragmentary, rear diagrammatic view, as seen from line 4-4 of FIG. 1, showing the alternate embodiment structural reinforcement system of the present invention.
Figure 10:
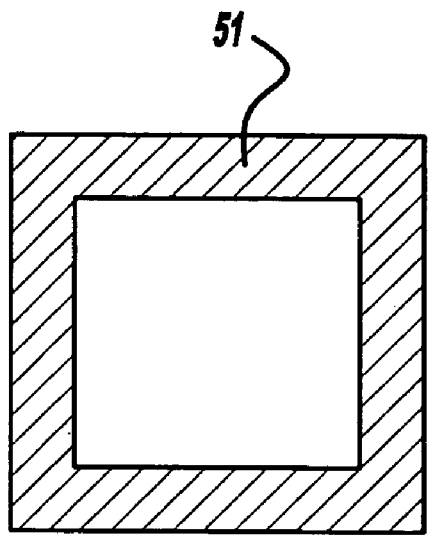
FIG. 10 is a cross-sectional view taken along line 10-10 of FIG. 4, showing the second alternate embodiment structural reinforcement system.
Figure 11:
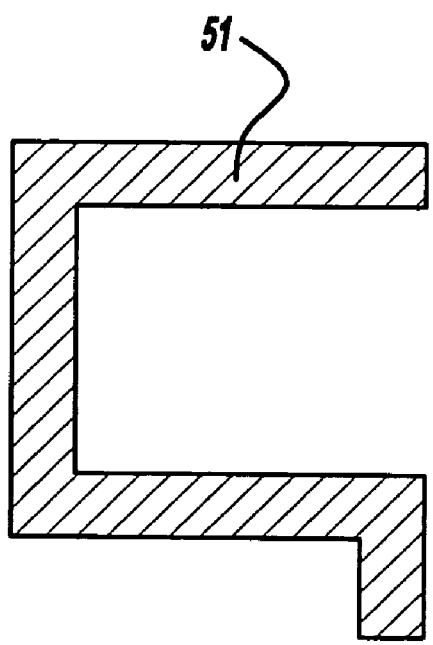
FIG. 11 is a cross-sectional view taken along line 10-10 of FIG. 4, showing the first alternate embodiment structural reinforcement system.
Figure 12:
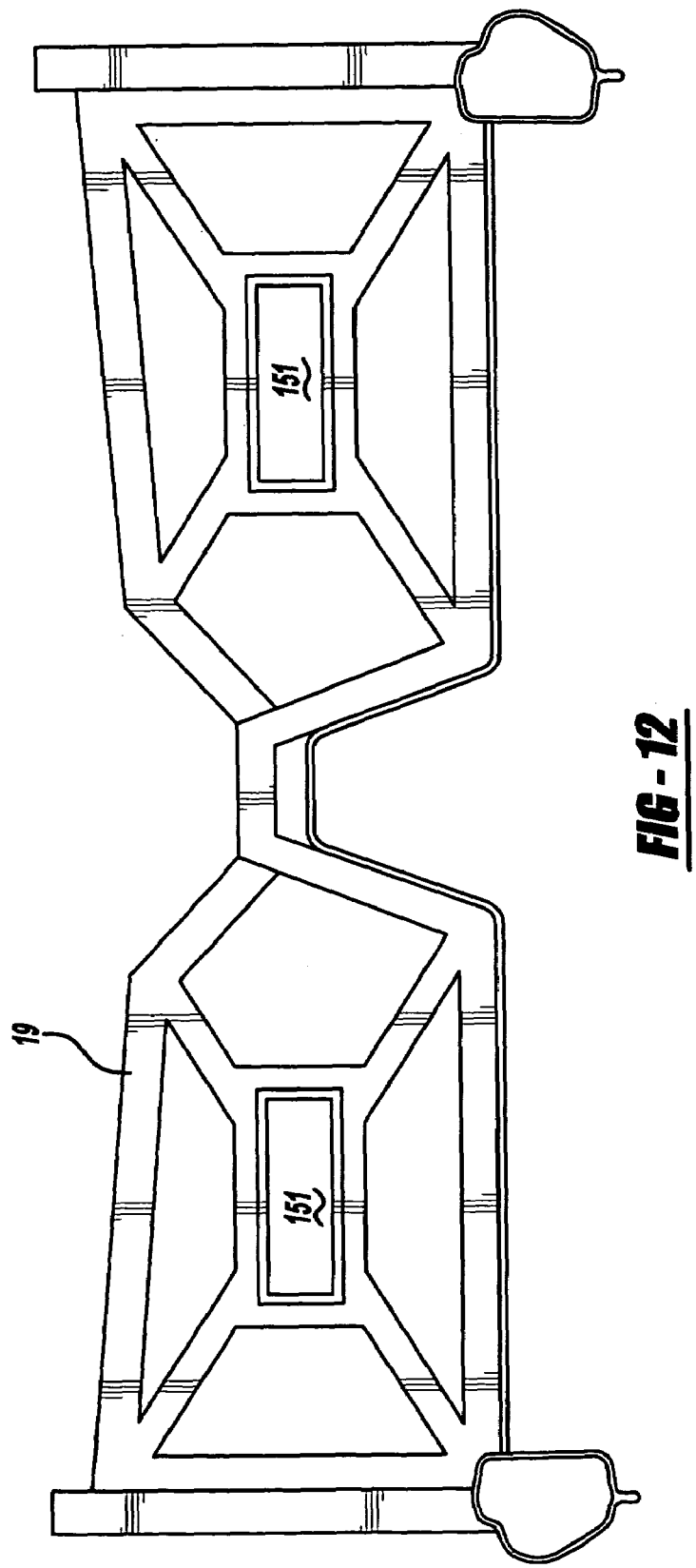
FIG. 12 is a diagrammatic rear view, as seen from line 4-4 of FIG. 1, showing a fourth alternate embodiment structural reinforcement system of the present invention.

Returning to the alternate embodiment of FIGS. 4-6, structural reinforcement system 19 is made up of multiple cross-vehicle upper and lower beams 51 and 53, respectively, and interconnected diagonal and vertical beams 55 and 57, respectively. Upper beam 51 is positioned adjacent a beltline 61 of the vehicle and lower beam 53 is attached to a sheet metal floor pan 63 of the vehicle. The outboard vertical beams 57 are welded, riveted or otherwise secured to B-pillars 65 of the vehicle. Beams are integrally hydroformed as a single steel piece, as shown in FIGS. 4, 6, 8, 10, 12, 13 and 15. In another embodiment, beams are integrally stamped from sheet metal as a single piece, as shown in FIGS. 5, 9 and 11. Gussets 91 are attached to a center tunnel 93 of vehicle and to outboard rocker panels 95 of the unibody vehicle. Alternately, separated created beams can be welded together.

Reference should be made to FIGS. 7 and 8 where a polymeric center, floor trim console 101 extends from a front passenger area 107, through a recess 103 in upper beam 51 and into a rear seating area 109, between bucket front seats and bucket rear seats. Polymeric trim panels 105 also cover the exterior of structural system 19. Door hinge hardware 121 can be secured directly to reinforcement system 19 by bolts, rivets or welding. A decorative B-pillar facia 123 is attached to structural system 19 in an alternate embodiment. An electronic entertainment system 141, such as including an audio or video compact disc player, movie player, radio or the like, is located in a central pocket of each side of structural system 19 for use by the rear seat passengers. Furthermore, an inflatable air bag system 151 (see FIG. 12) may be provided in each pocket of structural system 19, the beams of which are angled to properly channel the deployment forces into the floor and B-pillars. Moreover, roll bars 161 (see FIG. 4) are optionally secured to upper beam 51 on each side of the vehicle's fore-and-aft centerline 162.

Figure 13:
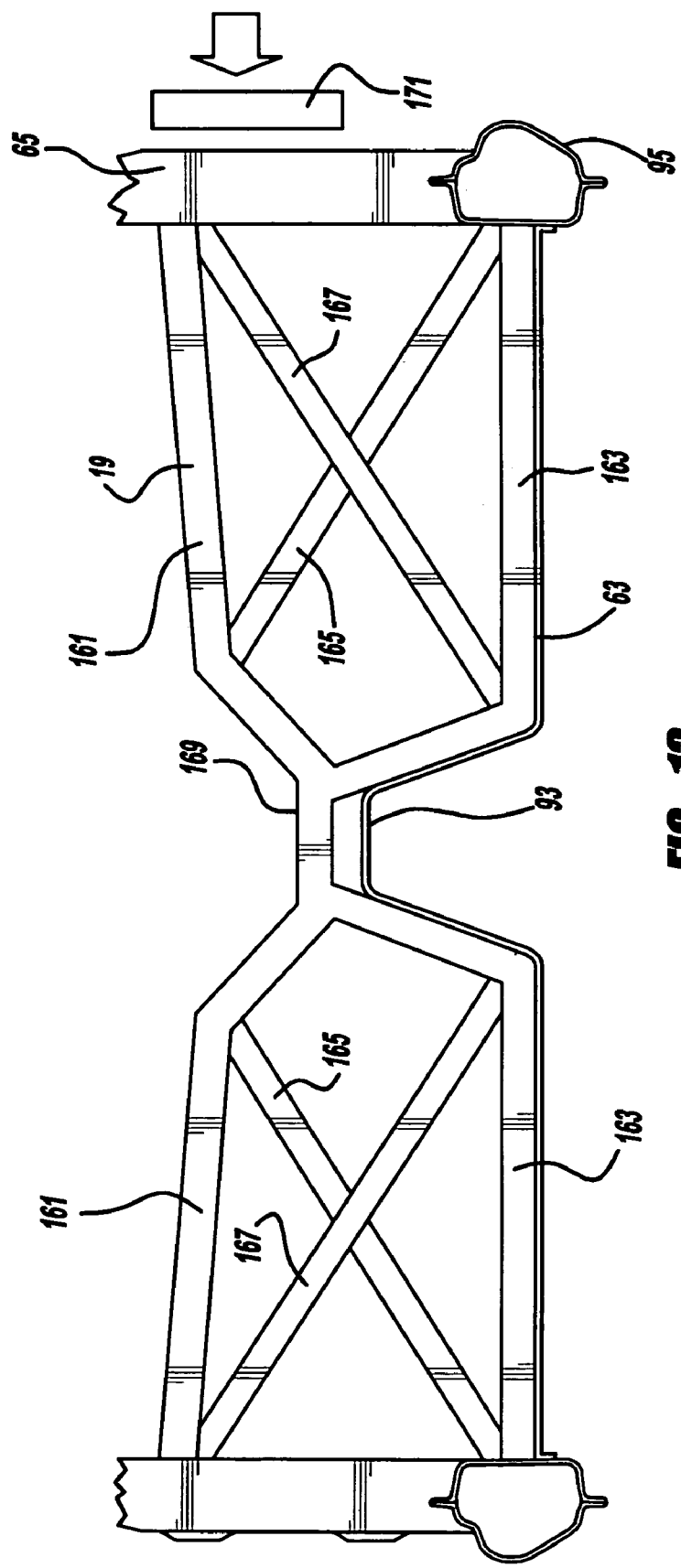
FIG. 13 is a diagrammatic rear view, as seen from line 4-4 of FIG. 1, showing a fifth alternate embodiment structural reinforcement system of the present invention.

FIG. 13 illustrates a fifth alternate embodiment structural reinforcement system 19 of the present invention. This exemplary structural reinforcement system 19 includes an upper beam 161, a lower beam 163, and pairs of crossing diagonal beams 165 and 167 spanning between the upper and lower beams outboard of a middle, recess 169 where upper and lower beams 161 and 163 converge. Ends of upper and lower beams 161 and 163 are directly affixed to adjacent and generally vertical B-pillars 65 and rocker panels 95, without supplemental vertical beams. A simulated bumper 171, according to FMVSS 214, is shown adjacent to the vehicle beltline which is generally aligned with the intersection between upper beam 161 and B-pillar 65.

Figure 14:
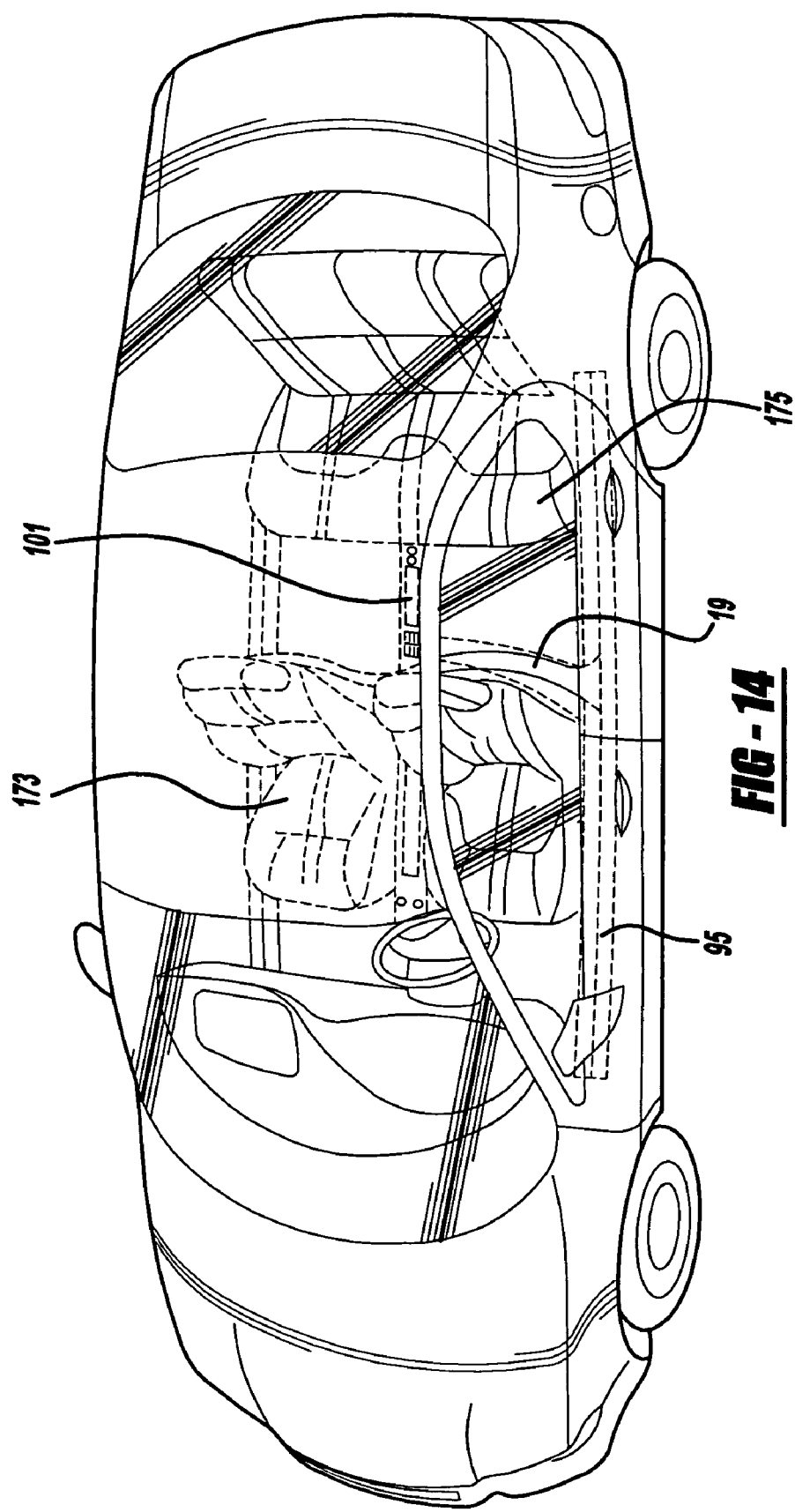
FIG. 14 is a perspective view showing the fifth alternate embodiment structural reinforcement system of the present invention.

FIG. 14 shows structural reinforcement system 19 with a floor-mounted, trim console 101 centrally extending in a fore-and-aft centerline direction of the vehicle. In this variation, console 101 extends between bucket front seats 173 and either is interrupted by, passes above or passes below beam recess 169. The rear end of console 101 terminates forward of a bench rear seat 175.

Figure 15:
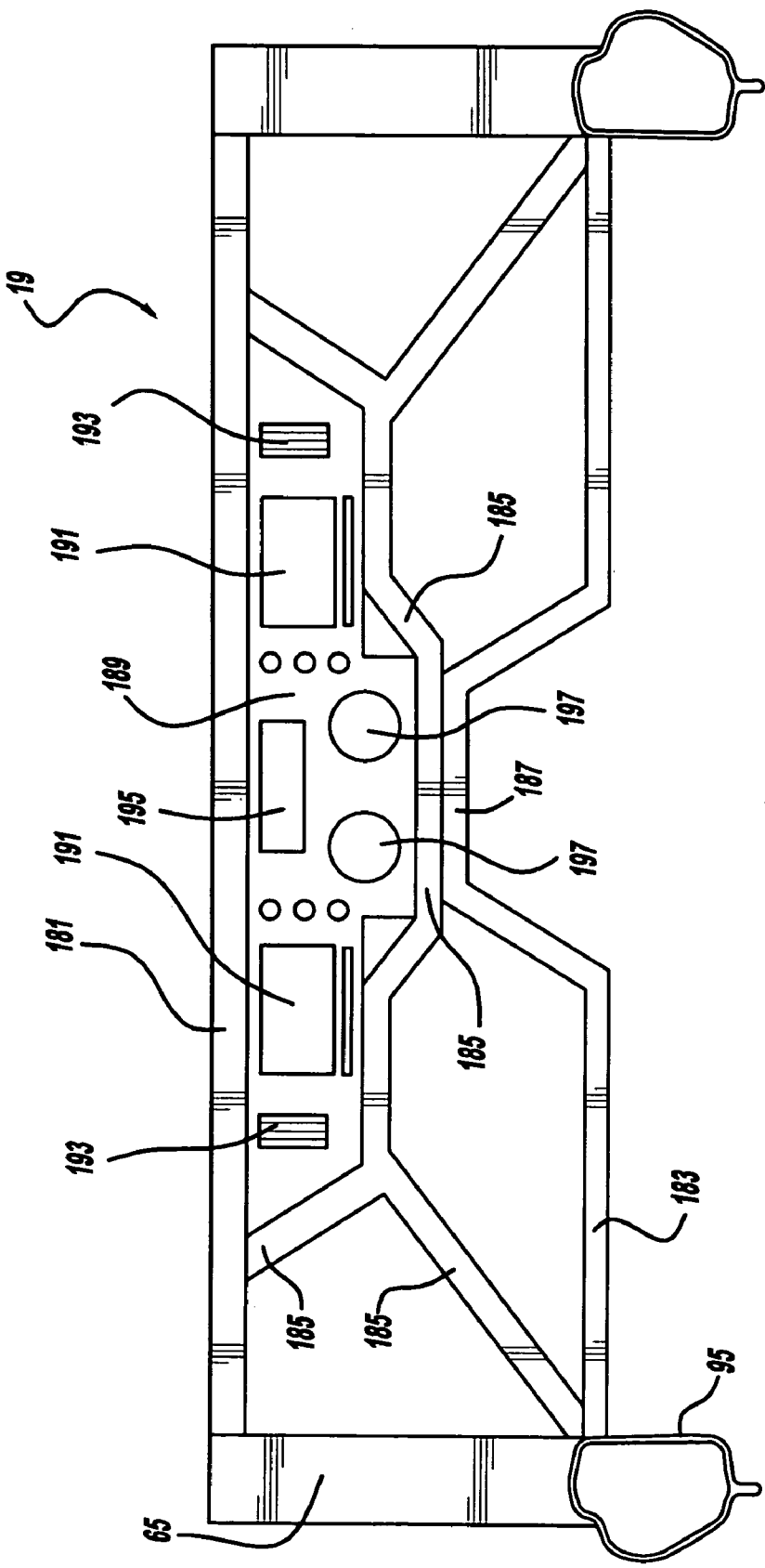
FIG. 15 is a diagrammatic rear view, as seen from line 4-4 of FIG. 1, showing a sixth alternate embodiment structural reinforcement system of the present invention.

A sixth alternate embodiment system 19 is shown in FIG. 15. In this embodiment, a generally straight and horizontal upper beam 181 is connected to a lower beam 183 by multiple branching, intermediate beams 185. Lower beam 183 has a raised central segment 187 to circumvent the floor tunnel. Beams 181 and 183 are attached to B-pillars 65 and rocker panels 95. A central, component cluster assembly 189 is mounted to system 19 within an aperture between the beams for use by the rear seat passengers. Component cluster assembly 189 includes audio and video entertainment systems 191, heating/ventilating/air conditioning ducts and controls 193, a storage compartment 195, communications devices 197, and the like.

Figure 16:
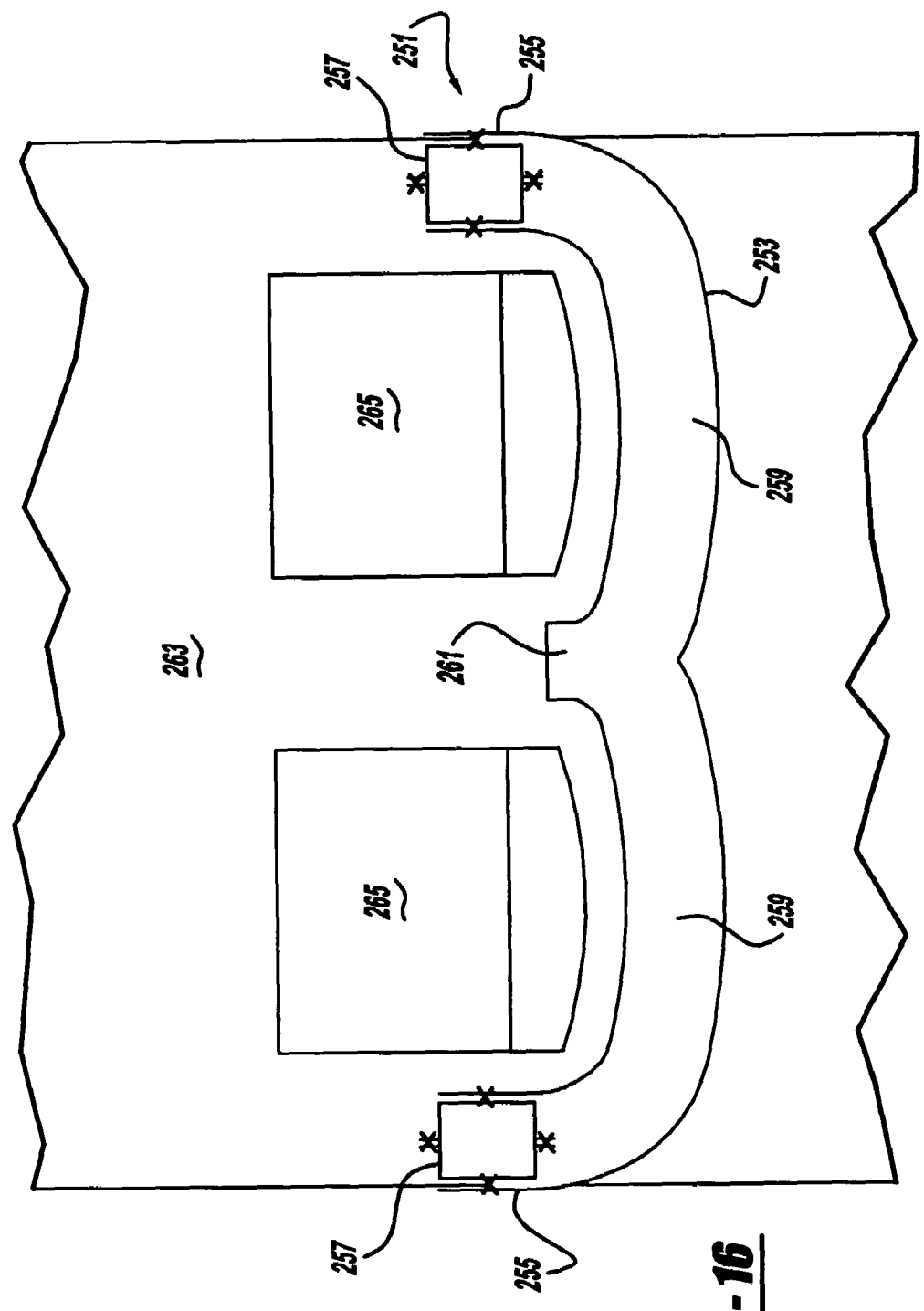
FIG. 16 is a diagrammatic top view showing a seventh alternate embodiment structural reinforcement system of the present invention.

Referring to FIG. 16, a seventh alternate embodiment of a structural reinforcement system 251 includes a structural beam 253 extending in a primarily cross-vehicle direction. Ends 255 of beam 253 are welded or otherwise fastened to B pillars 257. Beam 253 has a pair of arcuately curved segments 259 joining at a forwardly extending central segment 261 which can be optionally secured to a floor panel 263 or fore-and-aft extending tunnel attached thereto, by a generally vertical bracket or gusset. A front seat 265 is located forward of each curved segment 259 and each seat back may have a top view curve conforming with the adjacent curved shape of beam 253. A floor mounted, interior trim console (such as that shown in FIG. 14) may be provided between seats 265 and can either extend above center segment 261 for use by both front and rear seat passengers, may extend below central segment 261 such that the center portion of beam 253 creates an aesthetic styling element in the vehicle as well as providing a functional reinforcement, or a two-piece console may sandwich central segment 261 of beam 253. The rear view shape of beam 253 can extend straight across the vehicle or may have a central depression such as that shown in FIGS. 4 and 7.

Figure 17:
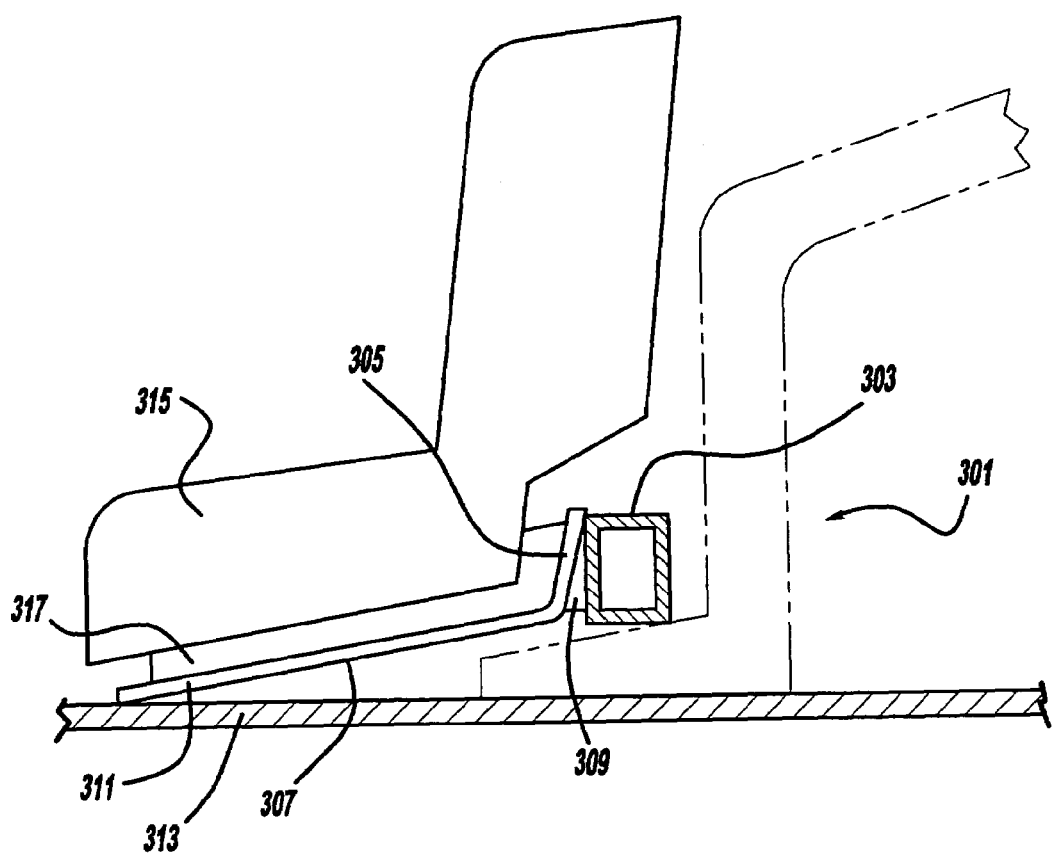
FIG. 17 is a diagrammatic side view showing an eighth alternate embodiment structural reinforcement system of the present invention.

FIG. 17 illustrates an eighth alternate embodiment structural reinforcement system 301 of the present invention. In this embodiment, a structural beam 303 extends in a generally straight (when viewed from the top and rear) orientation between the B-pillars or other upstanding structural members of the automotive vehicle adjacent the rocker panels. Beam 303 is an enclosed and hollow polygon, here shown with four sides when viewed in cross-section, which can be created from and extruded or hydroformed steel. Rear sections 305 of metal seat tracks 307 are attached to beam 303 by welded or riveted brackets 309. Front sections 311 of seat tracks 307 are attached to a metal floor panel 313 by welded, riveted or bolted on brackets. Front seats 315, or other passenger seats, and their respective seat movement mechanisms 317 are attached to seat tracks 307. Exemplary seat movement mechanisms 317 are disclosed in U.S. Pat. No. 5,575,531 entitled "Vehicle Power Seat Adjuster with End Driven Lead Screw Actuation" which issued to Gauger, et al. on Nov. 19, 1996, and is incorporated by reference herein. Space is provided below beam 303 and the adjacent portion of seat tracks 307 so as to maximize passenger compartment leg room and foot room. Beam 303 is secured to the vehicle well below a belt line area but may be useful in trucks, vans, sport utility vehicles and other situations that serve to add the required vibrational stiffness, minimize cross-vehicle and diagonal twisting of the vehicle body, while also improving crashworthiness during side impact. Thus, beam 303 advantageously serves as a multifunctional part.

Figure 19:
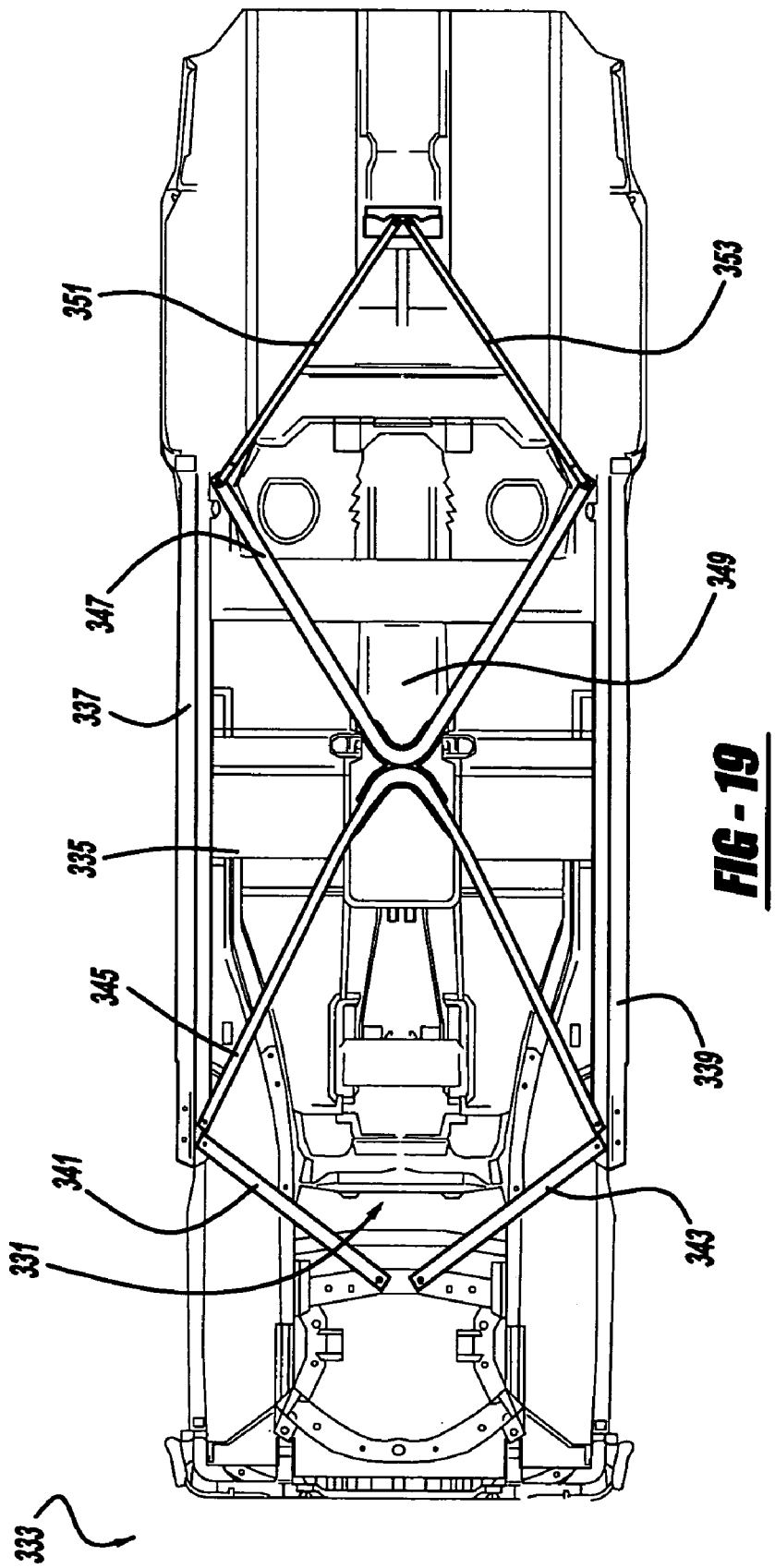
FIG. 19 is a bottom elevational view showing a first preferred embodiment of the structural system of the present invention.

A first preferred embodiment of the structural system of the present invention is shown in FIGS. 19-26. FIG. 19 illustrates supplemental bracing of underbody 331 of an automotive vehicle 333, which includes a structural floor pan 335 and rocker panels 337 and 339. The supplemental bracing includes a pair of inwardly angled front braces 341 and 343, a pair of oppositely expanding V-shaped middle braces 345 and 347, a generally flat central brace 349 extending fore and aft of middle braces 345 and 347, and a pair of inwardly angled rear braces 351 and 353.

Referring now to FIGS. 21-25, a center or B-pillar 361 upwardly projects in a generally vertical manner between front and rear door openings 363 and 365, respectively, from each rocker panel 337 on the outboard sides of floor pan 335. Each B-pillar has an inner, stamped steel panel 367, an outer, stamped steel panel 369 and an exterior, polymeric trim molding 371. Inner and outer panels 367 and 369 are welded together at flanges 373 and 375, and define an elongated hollow area 377 therebetween. Rocker panel 337 is similarly constructed with an inner, stamped steel panel 381 and an outer, stamped steel panel 383, welded together at pinch weld flanges 385 and defining a fore-and-aft elongated hollow area 387 therebetween.

A generally vertical, steel reinforcing tube 391 is welded to each center pillar 361, within hollow 377, and is attached to a generally fore-and-aft elongated and horizontal reinforcing steel tube 393 which is welded to rocker panel 337 in hollow 387. A reinforcement cross beam 401 is welded to a middle segment of vertical reinforcement tube 391 and is elongated in a generally straight, cross-vehicle and horizontal orientation projecting inwardly between the B-pillars 361. Cross beam 401 is a structural steel tube. An upper diagonal reinforcement tube 403 upwardly and outwardly extends from cross beam 401 and is welded onto an upper segment of vertical reinforcement tube 391, which is considered herein to be part of the B-pillar. A lower diagonal reinforcement tube 405 downwardly and outwardly extends from cross beam 401 and is welded to a lower segment of vertical reinforcement tube 391 and/or rocker reinforcement tube 393. Both B-pillar reinforcement systems are similarly constructed in mirrored symmetry to each other and are connected by the continuous cross beam 401.

Figure 21:
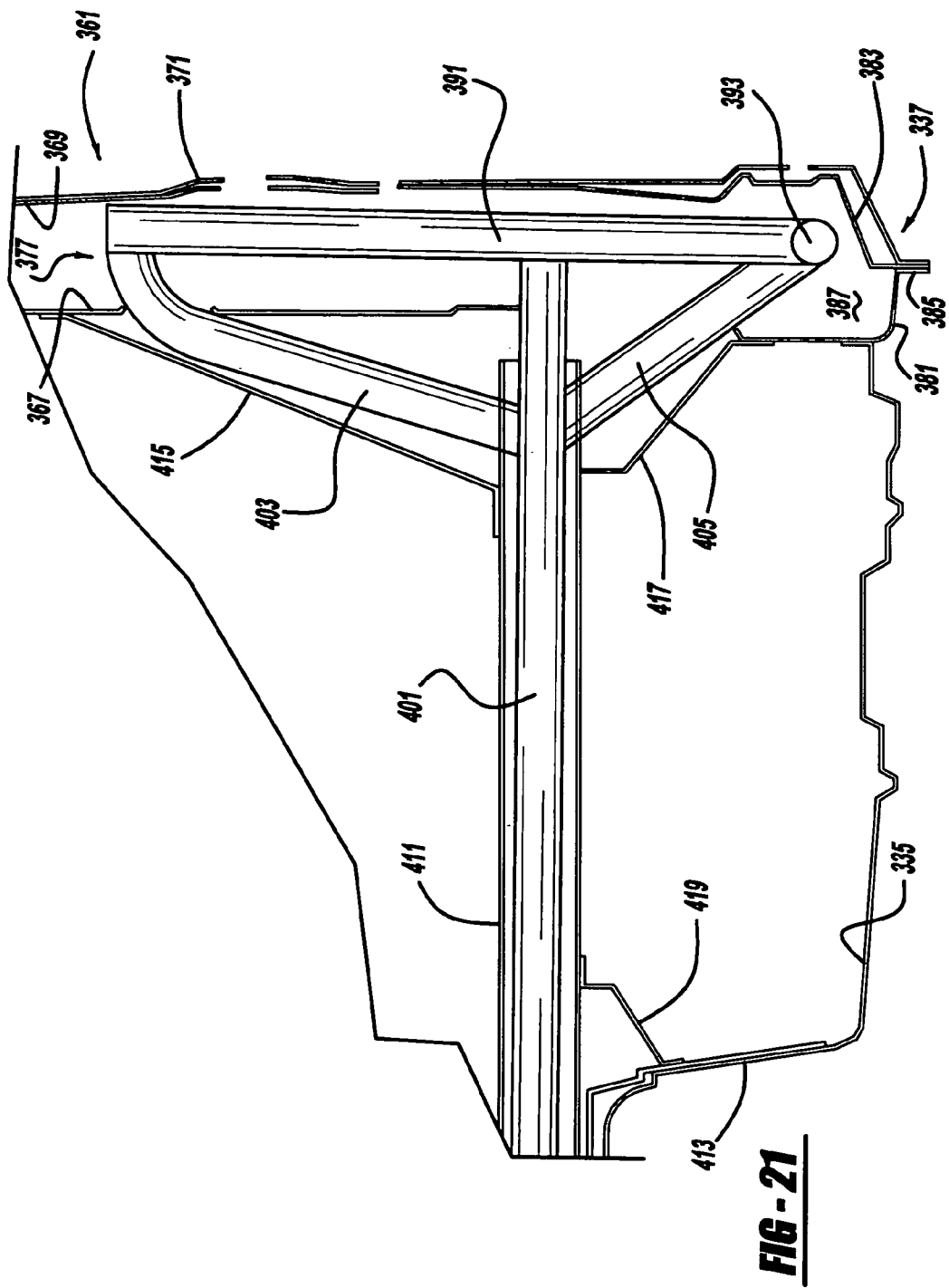
FIG. 21 is a fragmentary and rear, elevational view showing the first preferred embodiment structural system.
Figure 22:
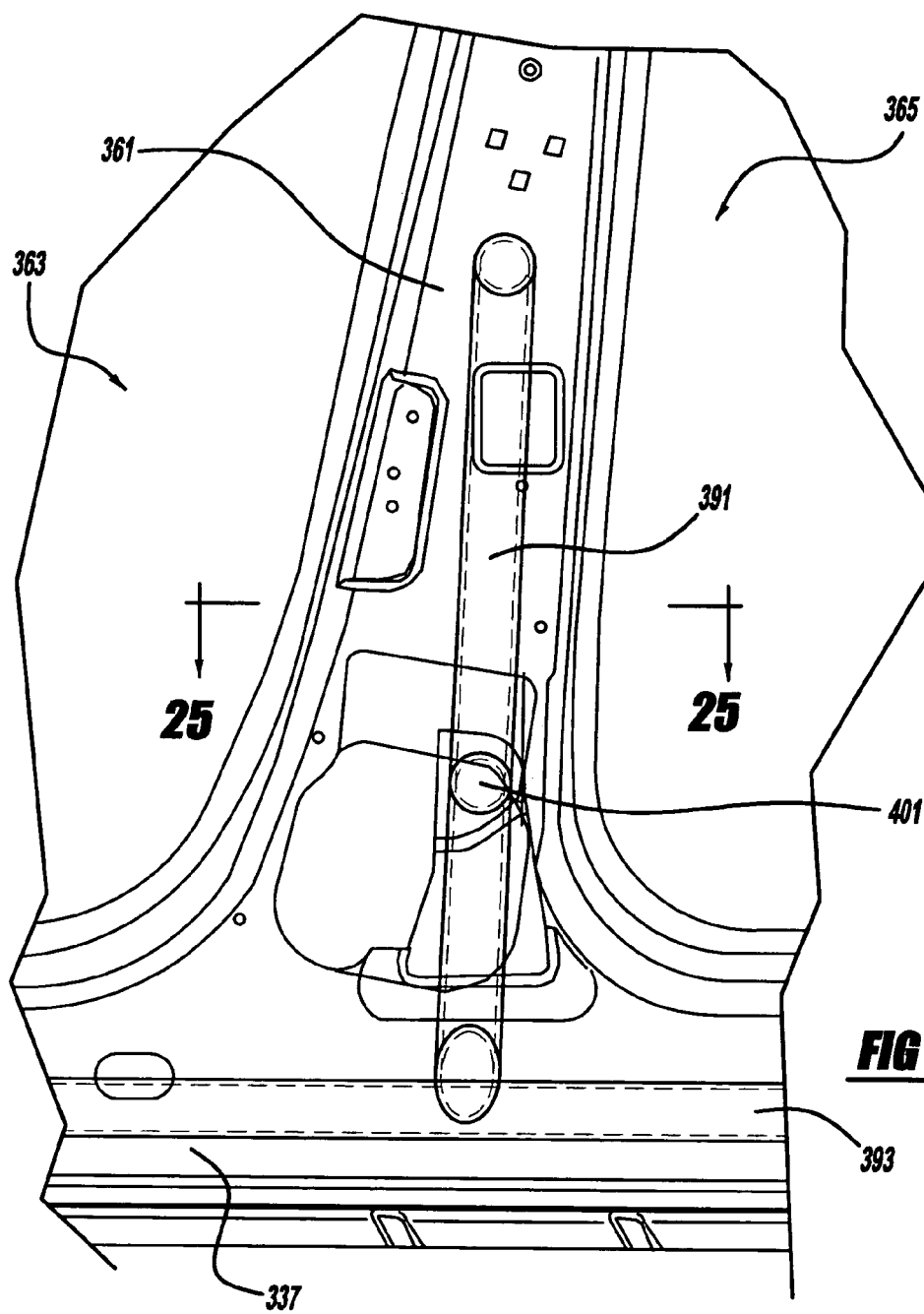
FIG. 22 is a diagrammatic side elevational view showing the first preferred embodiment structural system.
Figure 23:
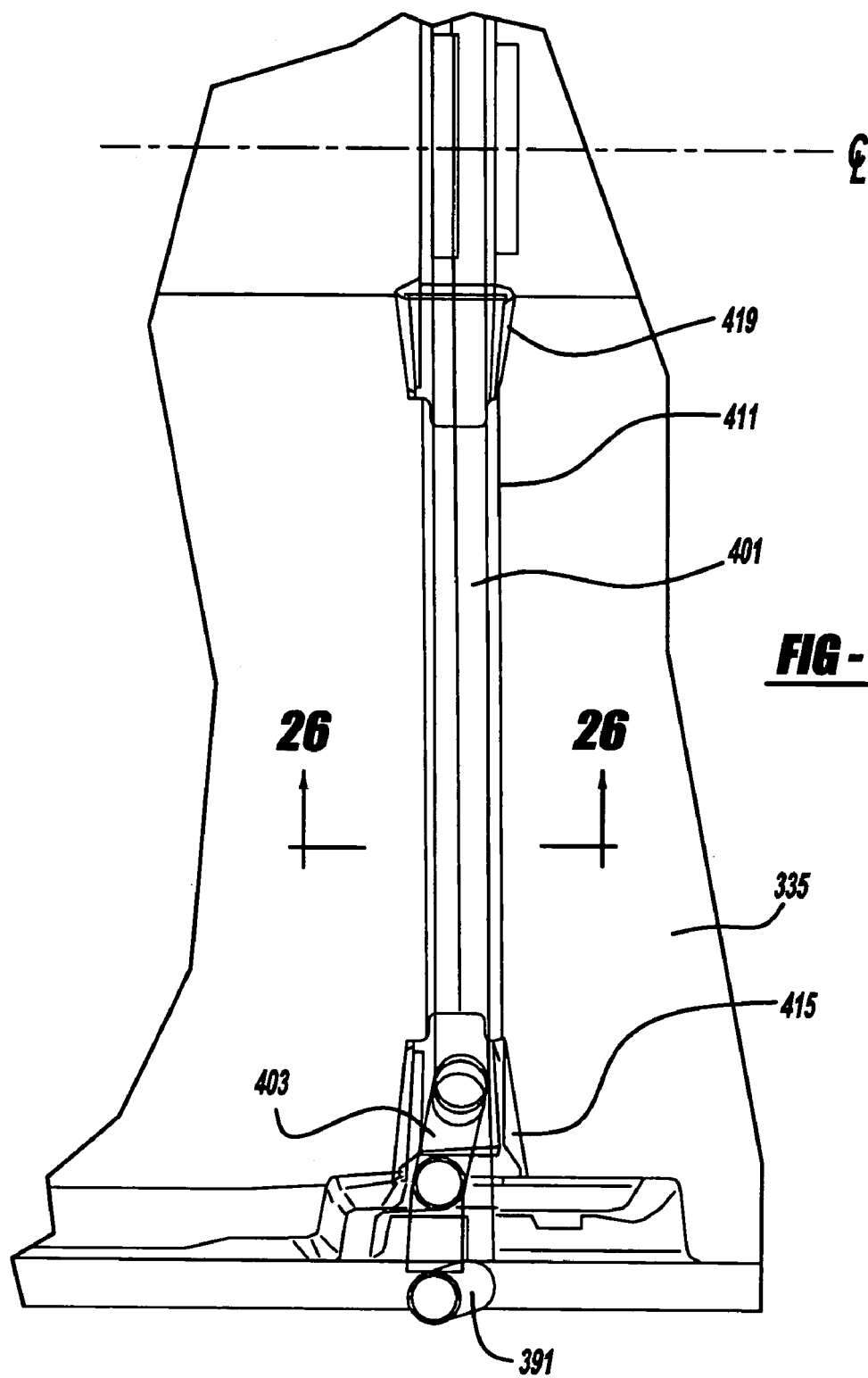
FIG. 23 is a diagrammatic top elevational view showing the first preferred embodiment structural system.
Figure 24:
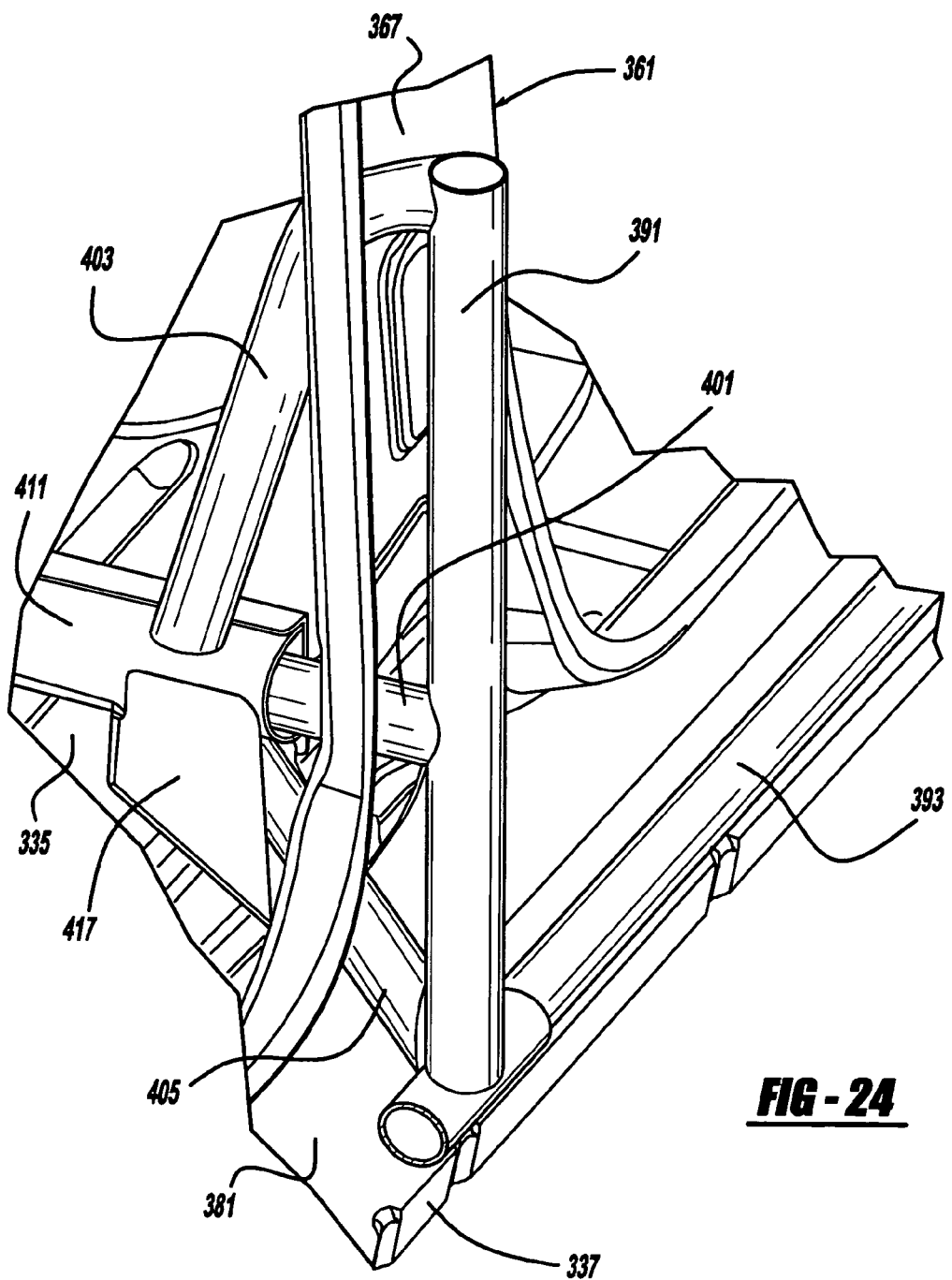
FIG. 24 is a fragmentary and perspective view showing the first preferred embodiment structural system.
Figure 25:
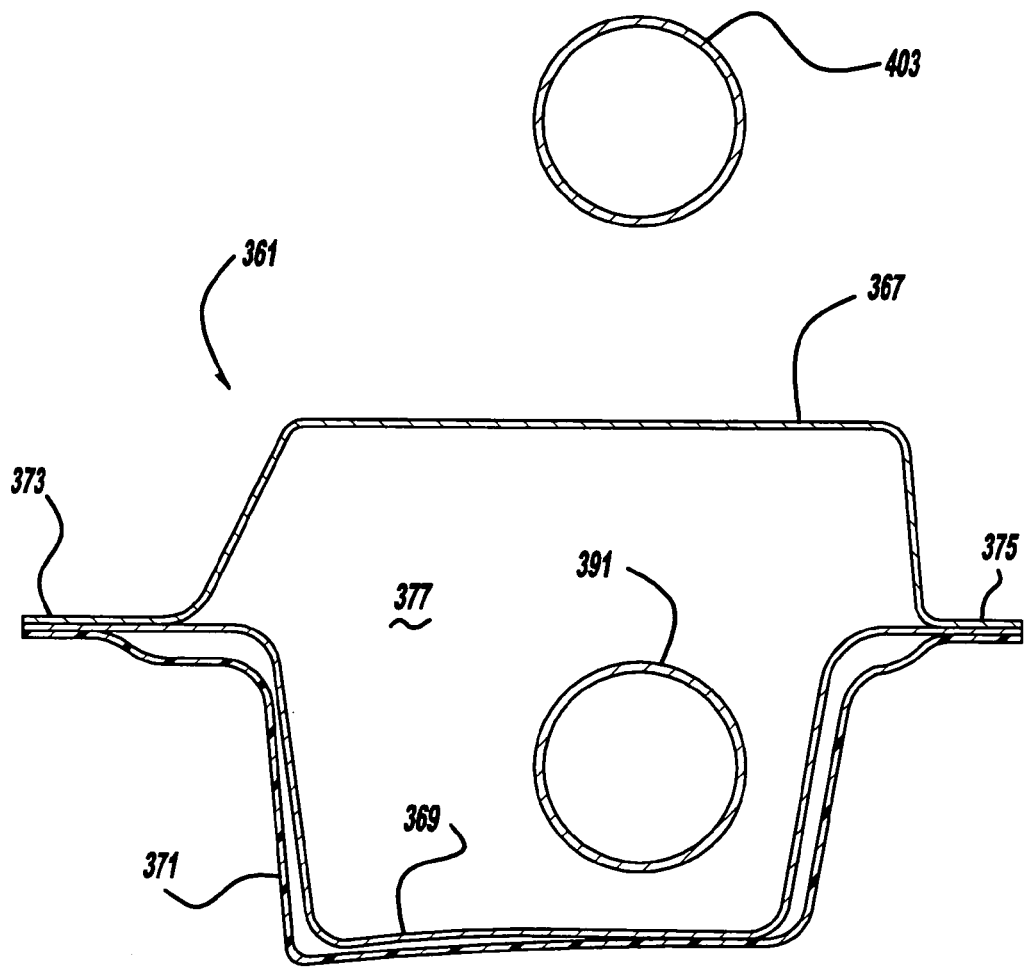
FIG. 25 is a cross-sectional view, taken along line 25-25 of FIG. 22, showing the first preferred embodiment structural system.
Figure 26:
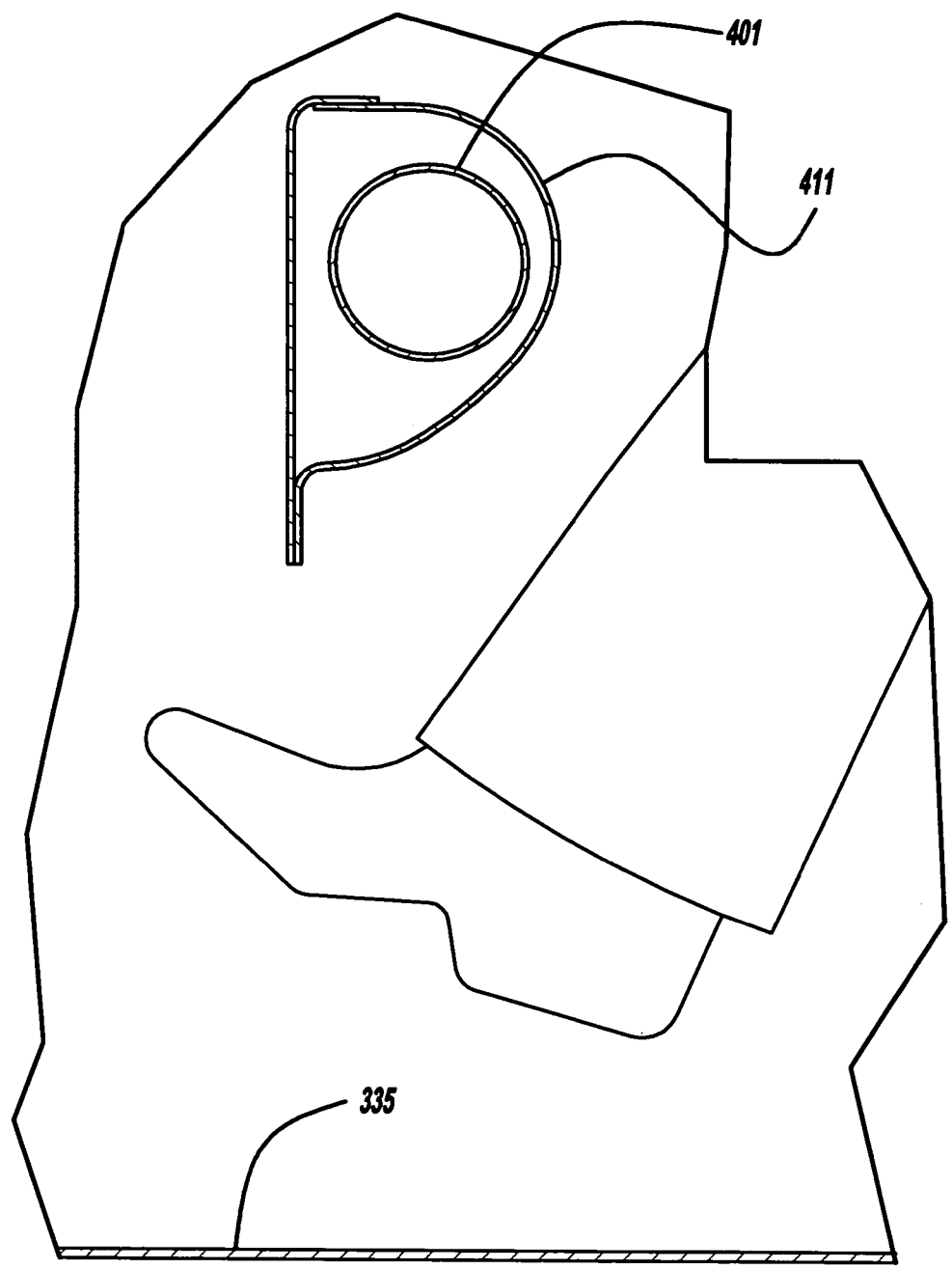
FIG. 26 is a cross-sectional view, taken along line 26-26 of FIG. 23, showing the first preferred embodiment structural system.

A structural outer member 411 is best observed in FIGS. 21, 24 and 26. Structural outer member or supplemental cross beam 411 is preferably shown as two stamped, steel parts that are welded or riveted together to encase or surround a majority of main cross beam 401 therein between B-pillars 361. Alternately, structural outer member 411 may consist of a circular-cylindrical tube or rectangular cross-sectionally shaped reinforcement surrounding cross beam 401. Preferably, cross beam 401 is inwardly spaced from a majority of support outer member 411, and outer member 411 is attached to B-pillars 361 and a floor tunnel 413 by diagonally extending, structural gusset covers 415, 417 and 419. Structural outer member 411 serves to reinforce and limit buckling of the otherwise straight cross beam 401 during a side impact collision and to further stiffen the vehicle body between the B-pillars 361 during extreme torsional operating forces of the vehicle.

Figure 20:
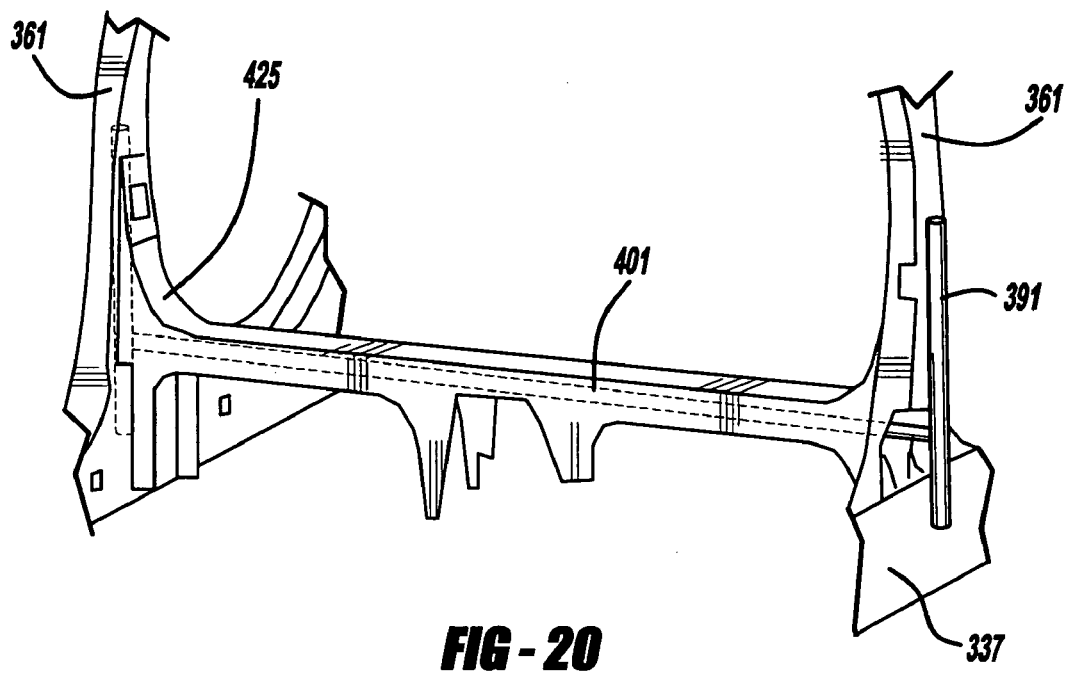
FIG. 20 is a fragmentary and perspective view showing the first preferred embodiment structural system.
Figure 31:
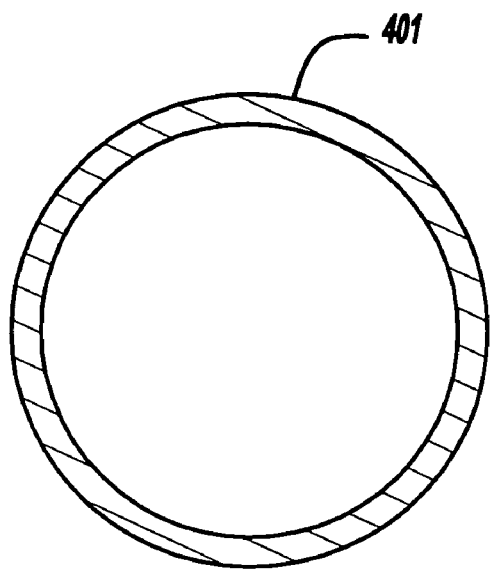
FIG. 31 is a cross-sectional view, taken along line 26-26 of FIG. 23, showing a portion of the preferred embodiment structural system.
Figure 32:
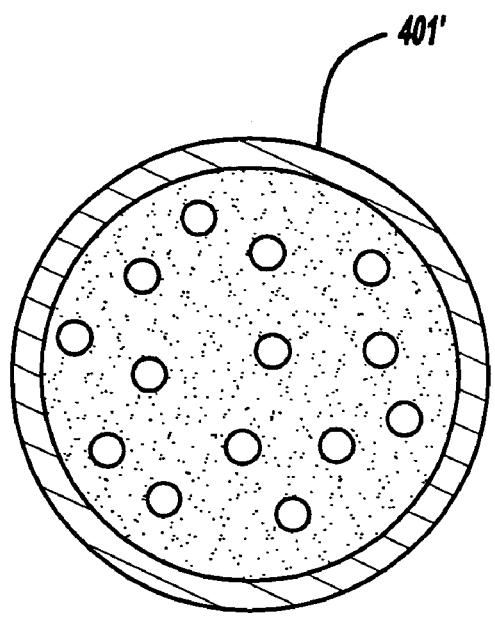
FIG. 32 is a cross-sectional view, like that of FIG. 31, showing a tenth alternate embodiment of the present invention structural system.
Figure 33:
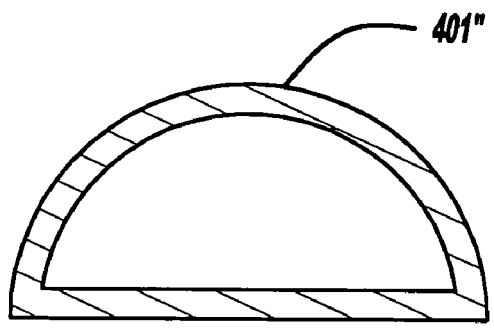
FIG. 33 is a cross-sectional view, like that of FIG. 31, showing an eleventh alternate embodiment of the present invention structural system.

FIG. 20 shows polymeric, interior trim panels 425 attached to B-pillars 361 and structural outer member 411, which may have fastening holes therein. Thus, cross beam 401, structural outer member 411, the gusset covers and diagonal tubes 403 and 405 are all aesthetically hidden by interior trim panels 425. Furthermore, foot room clearance is provided between the underside of interior trim panels 425, structural outer member 411 and cross beam 401, relative to the spaced apart floor pan 335, as can be observed in FIGS. 21 and 26. This structural system-to-floor spacing further improves side impact resistance and torsional resistance of the vehicle, especially when impacted by a truck or other raised bumper of a colliding vehicle. Cross beam 401 is preferably of a hollow and circular cross-sectional configuration, such as that shown in FIGS. 26 and 31, or it may be filled with a solid yet somewhat compressible foam, such as that shown in FIG. 32, filled with a solid polymeric material (not shown), or may have a D-like cross sectional shape such as that illustrated in FIG. 33.

Figure 27:
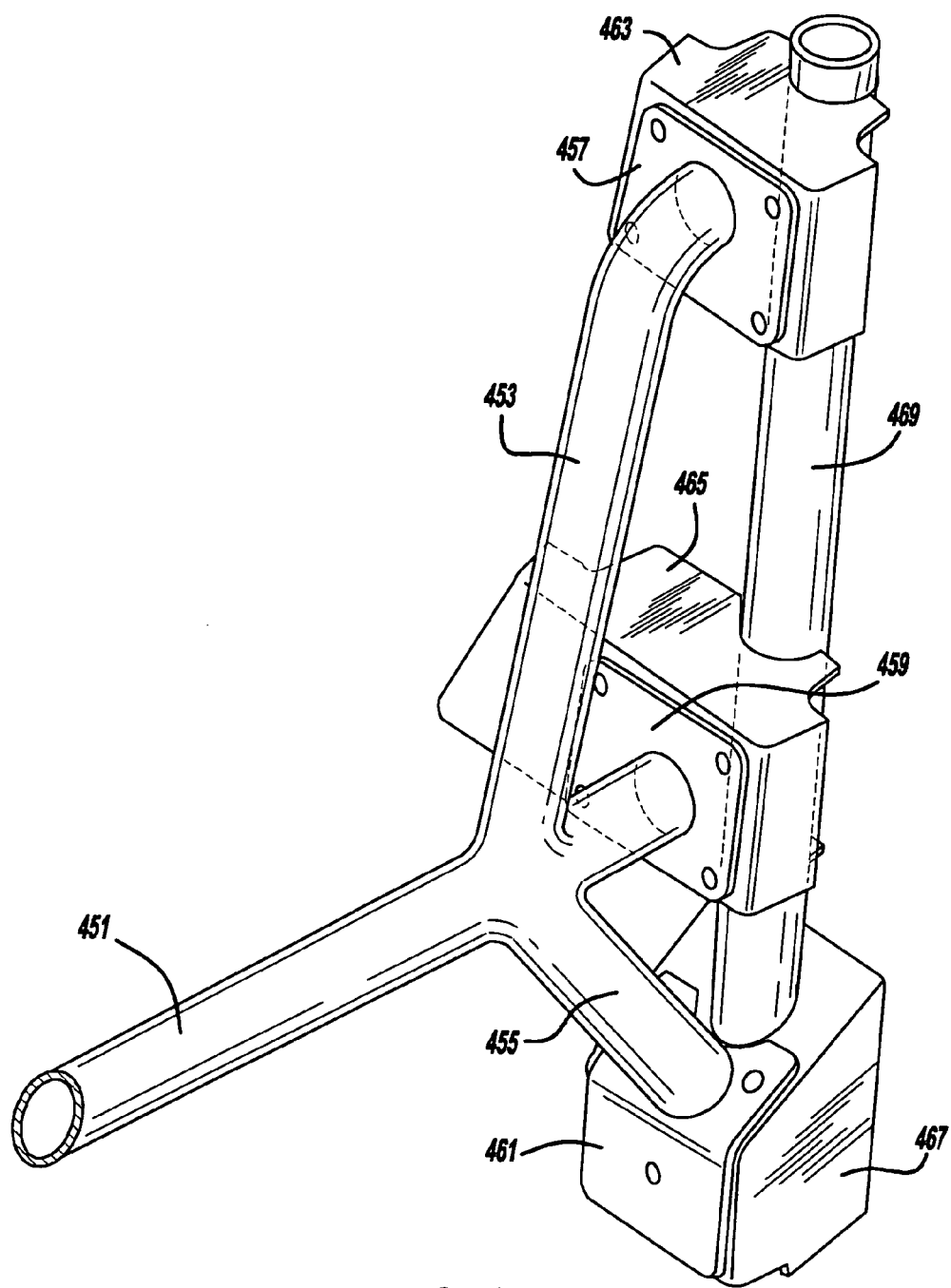
FIG. 27 is a fragmentary and perspective view showing a second preferred embodiment of the structural system of the present invention.
Figure 28:
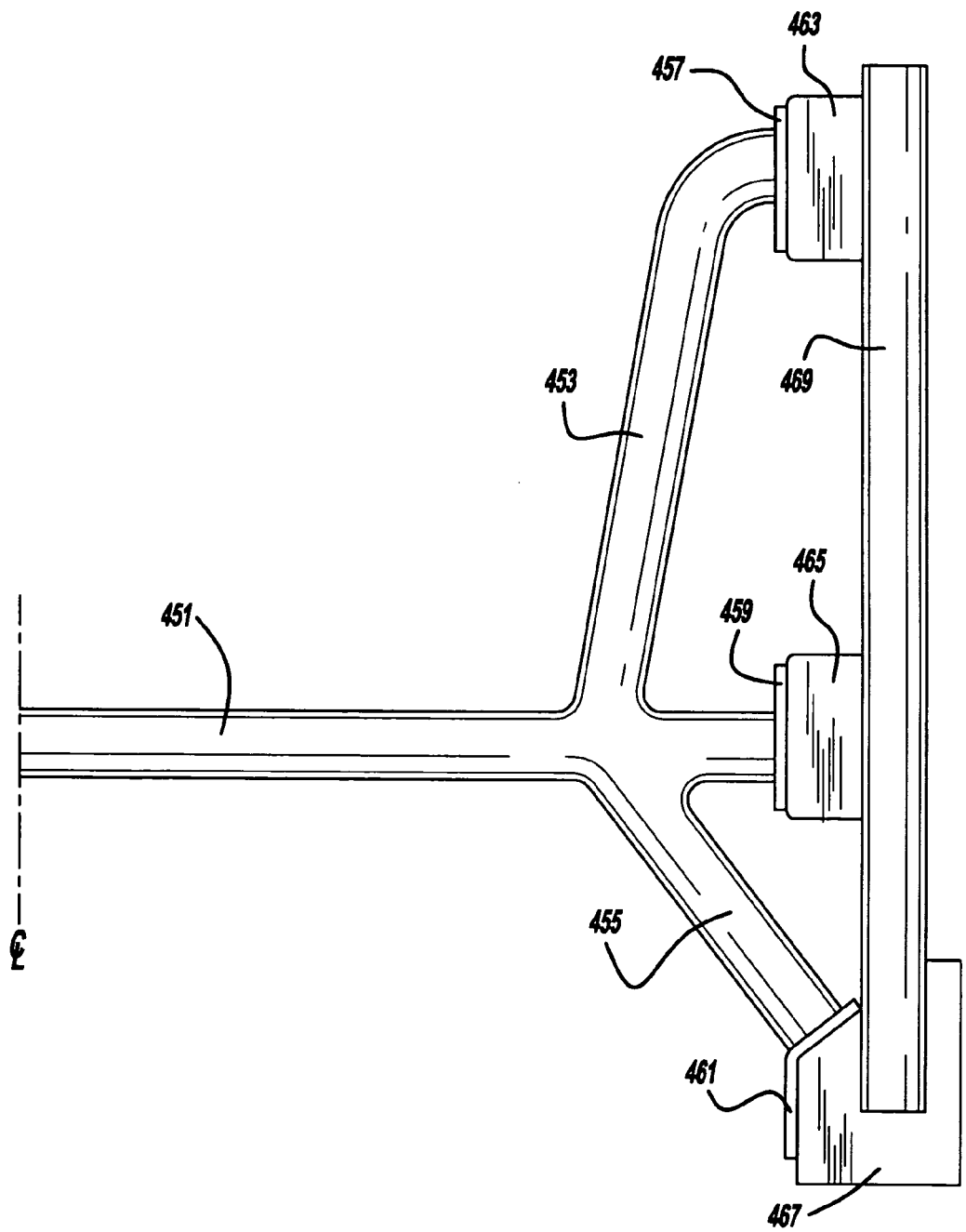
FIG. 28 is a rear, diagrammatic view showing the second preferred embodiment structural system.
Figure 29:
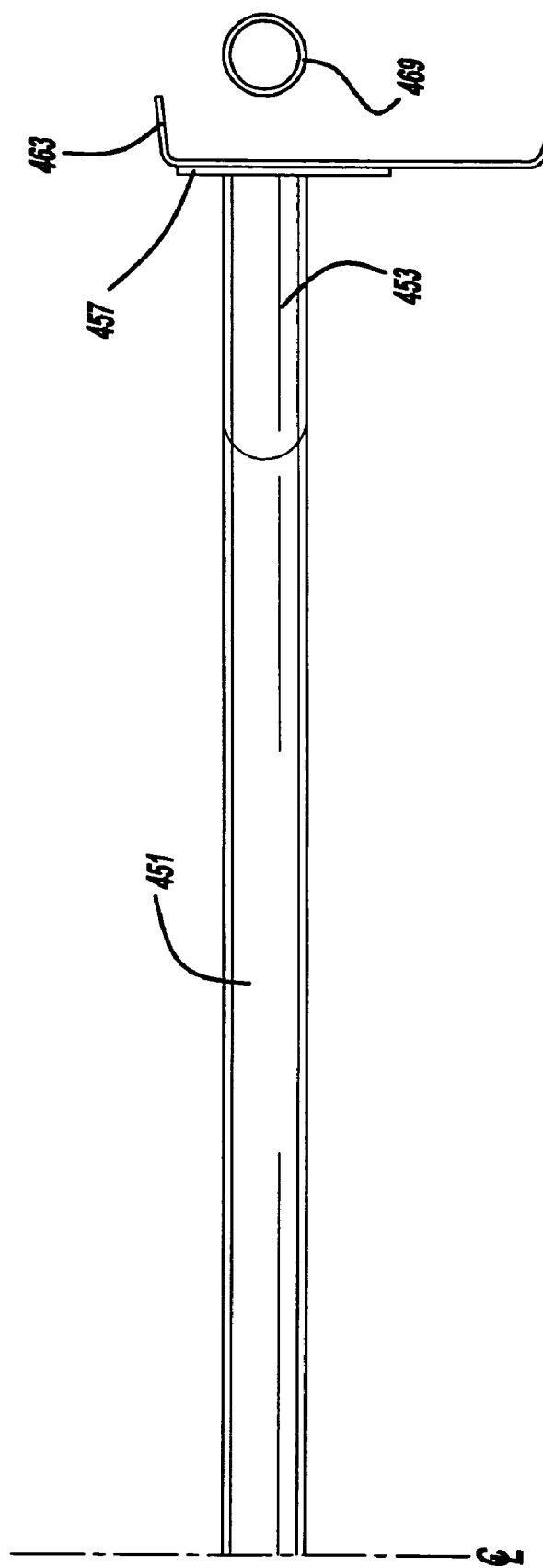
FIG. 29 is a top diagrammatic view showing the second preferred embodiment structural system.

A second preferred embodiment structural system of the present invention is illustrated in FIGS. 27-29. This embodiment is similar to the first preferred embodiment, however, a main cross beam 451 is integrally formed as a single piece with upper diagonal tube 453 and lower diagonal tube 455, such as by hydroforming or sheet stamping. Additionally, fore-and-aft enlarged plates 457, 459 and 461 are welded onto their respective ends of tubes 453 and 455, and beam 451. These plates 457, 459 and 461 are, in turn, screwed or riveted onto box-like stamped or cast brackets 463, 465 and 467 which are secured to a generally vertically extending reinforcement tube 469 welded inside of the center pillar. As an option, main cross beam 451 can be bolted to a center tunnel 413 as shown in FIG. 37.

Figure 30:
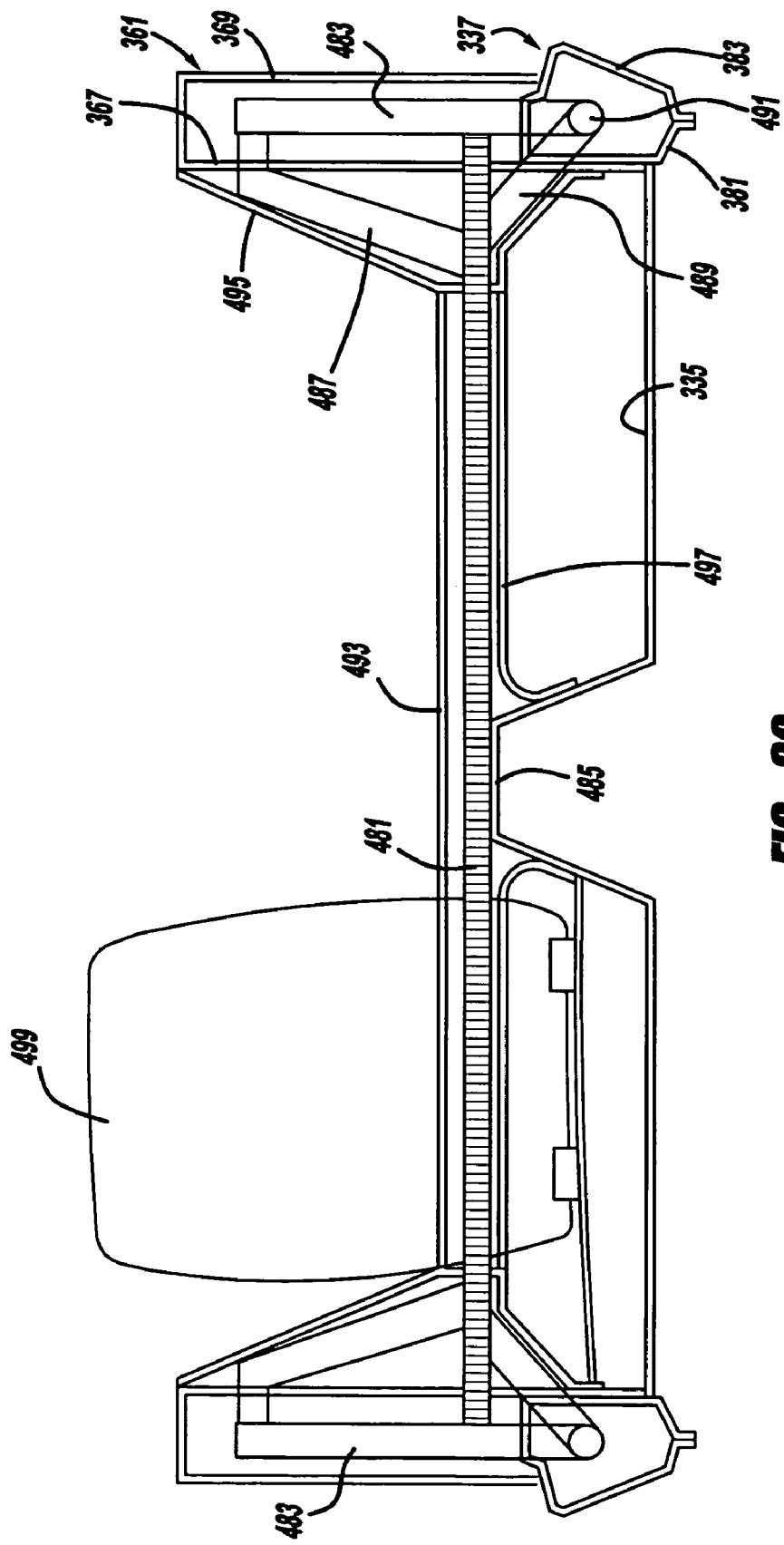
FIG. 30 is a rear diagrammatic view showing a ninth alternate embodiment of the present invention structural system.

FIG. 30 shows a ninth alternate embodiment structural system of the present invention wherein a straight and circularly sectioned cross beam 481 extends in a generally horizontal and crosscar direction and is directly coupled to generally vertical reinforcement tubes 483 welded within center pillars 361 and rocker panels 337. The center of cross beam 481 is welded to or passes above a centrally located and fore-and-aft elongated floor tunnel 485 of the vehicle. Diagonally extending upper and lower reinforcement tubes 487 and 489 couple outboard segments of cross beam 481 to pillar reinforcement tube 483 and a rocker reinforcement tube 491. Interior trim panels 493, 495 and 497 aesthetically cover the top, front, back and bottom of cross beam 481, and diagonal upper and lower reinforcement tubes 487 and 489. Front passenger seats 499 are located in front of and are independently movable in a fore-and-aft direction and up-down direction with regard to cross beam 481. Unlike with the first preferred embodiment, no surrounding structural member (such as 411 shown in FIG. 21) is employed.

Figure 34:
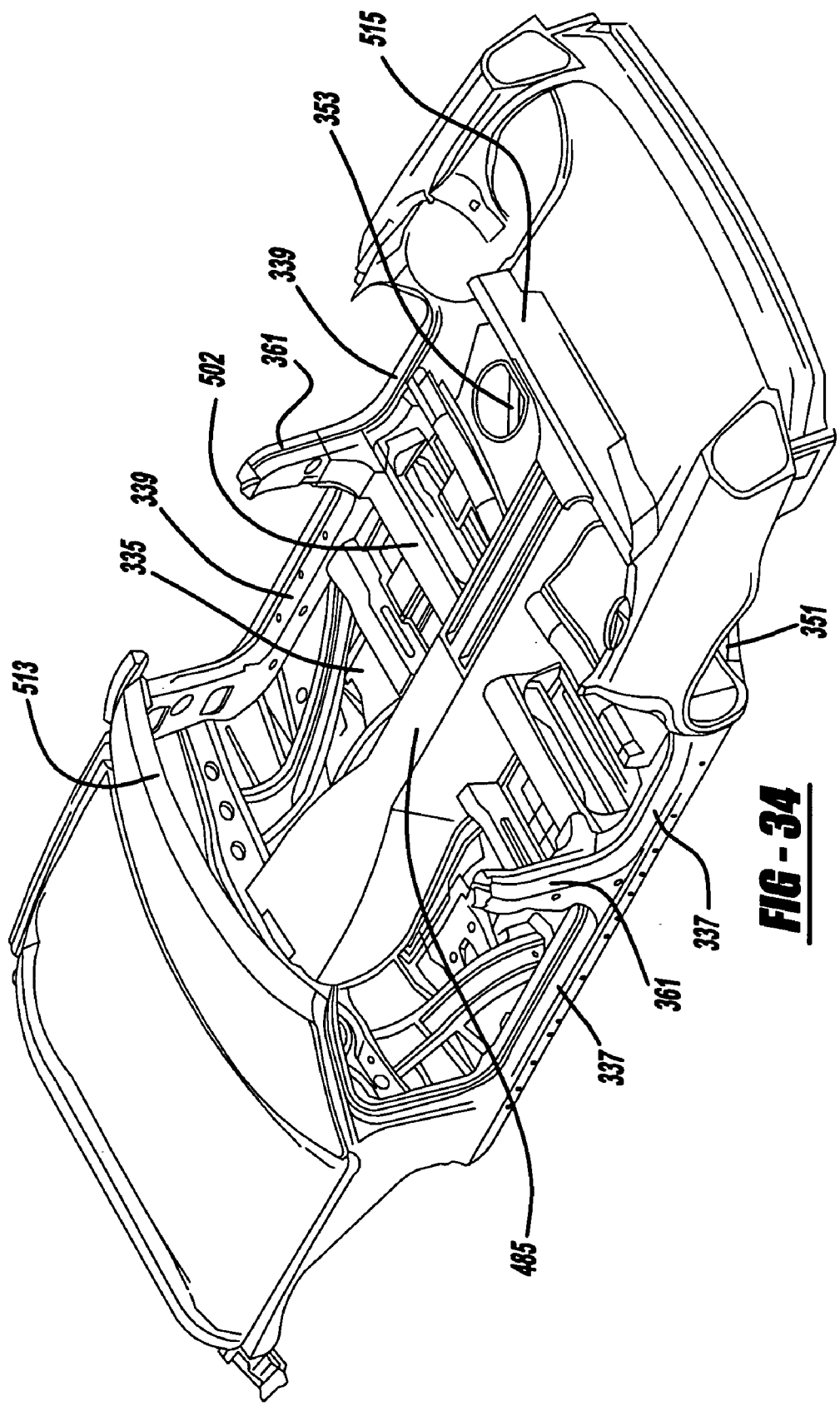
FIG. 34 is a rear perspective view showing a twelfth alternate embodiment of the structural system of the present invention.
Figure 35:
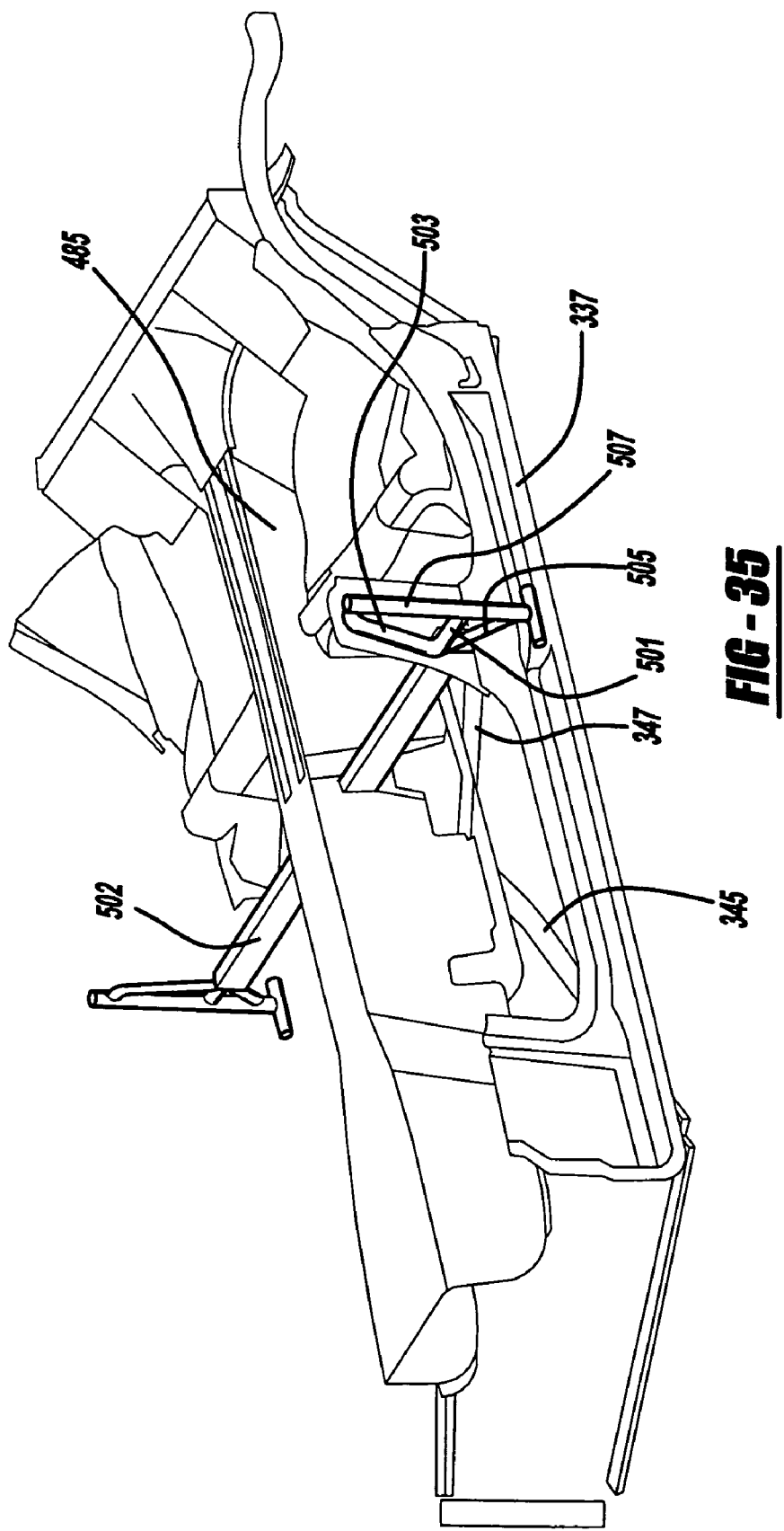
FIG. 35 is a fragmentary and front, perspective view showing the twelfth alternate embodiment structural system.
Figure 36:
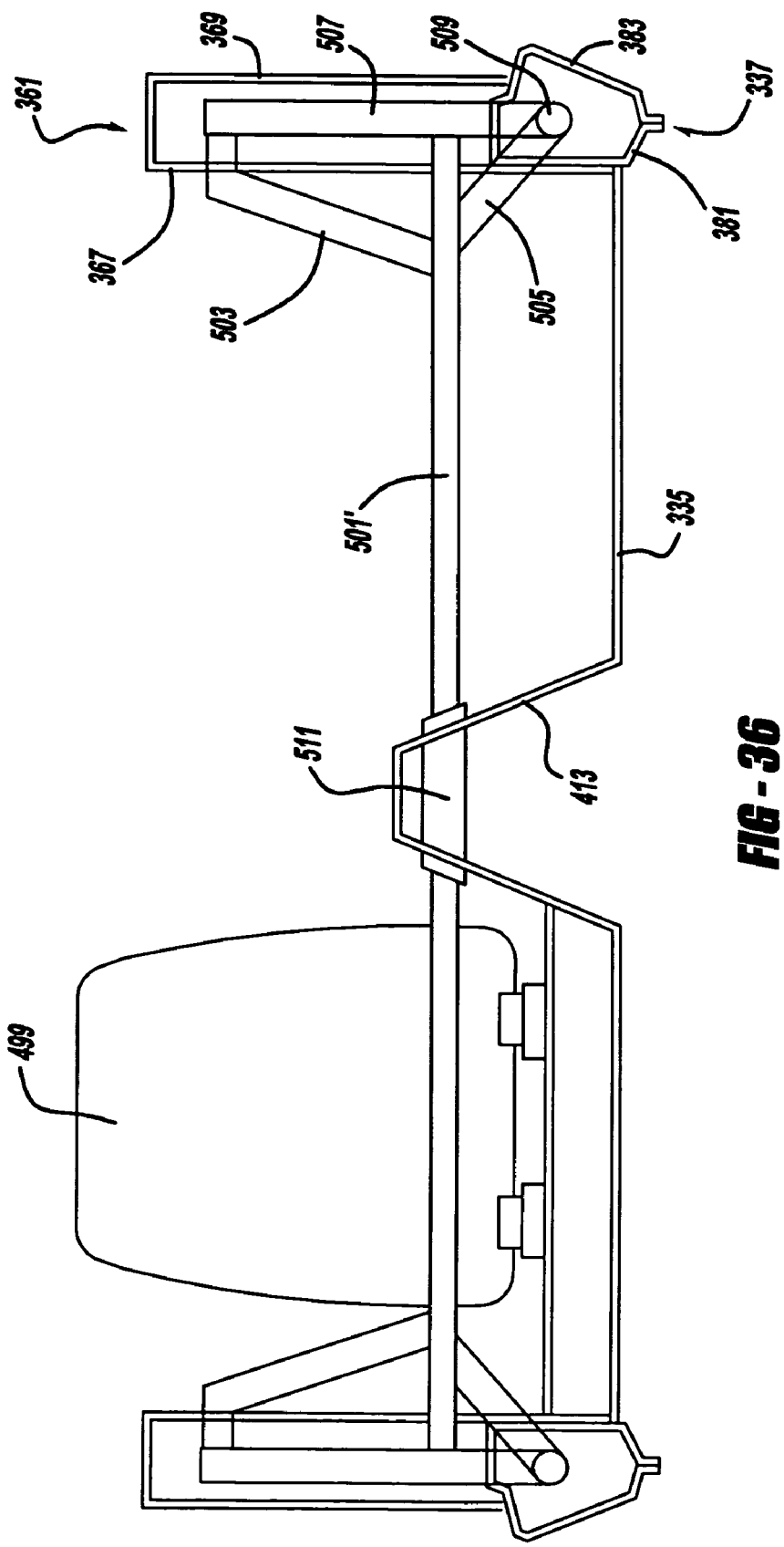
FIG. 36 is a rear, diagrammatic view showing the twelfth alternate embodiment structural system.

A twelfth alternate embodiment has a first sub-variation shown in FIGS. 34 and 35. A vehicle body, cross beam 501, structural outer reinforcement 502, upper and lower diagonal reinforcement tubes 503 and 505, vertical pillar reinforcement tubes 507 and rocker reinforcement tubes 509 are constructed like that disclosed in the first preferred embodiment, specifically FIGS. 21 and 26. Cross beam 501 and the surrounding structural outer member 502, however, differ in that they project in a generally straight line through floor tunnel 413 and are mounted inside a coupler 511 secured to floor tunnel 413. Referring to FIG. 36, a second sub-variation of this embodiment provides for a single cross beam 501' but without the supplemental structural outer member. It is also noteworthy that in this embodiment, as well as with the first preferred embodiment, additional structural, cross-vehicle panels 513 and 515 are provided at the front windshield header and between the rear wheel houses where the rear seat back panel is located.

Figure 37:
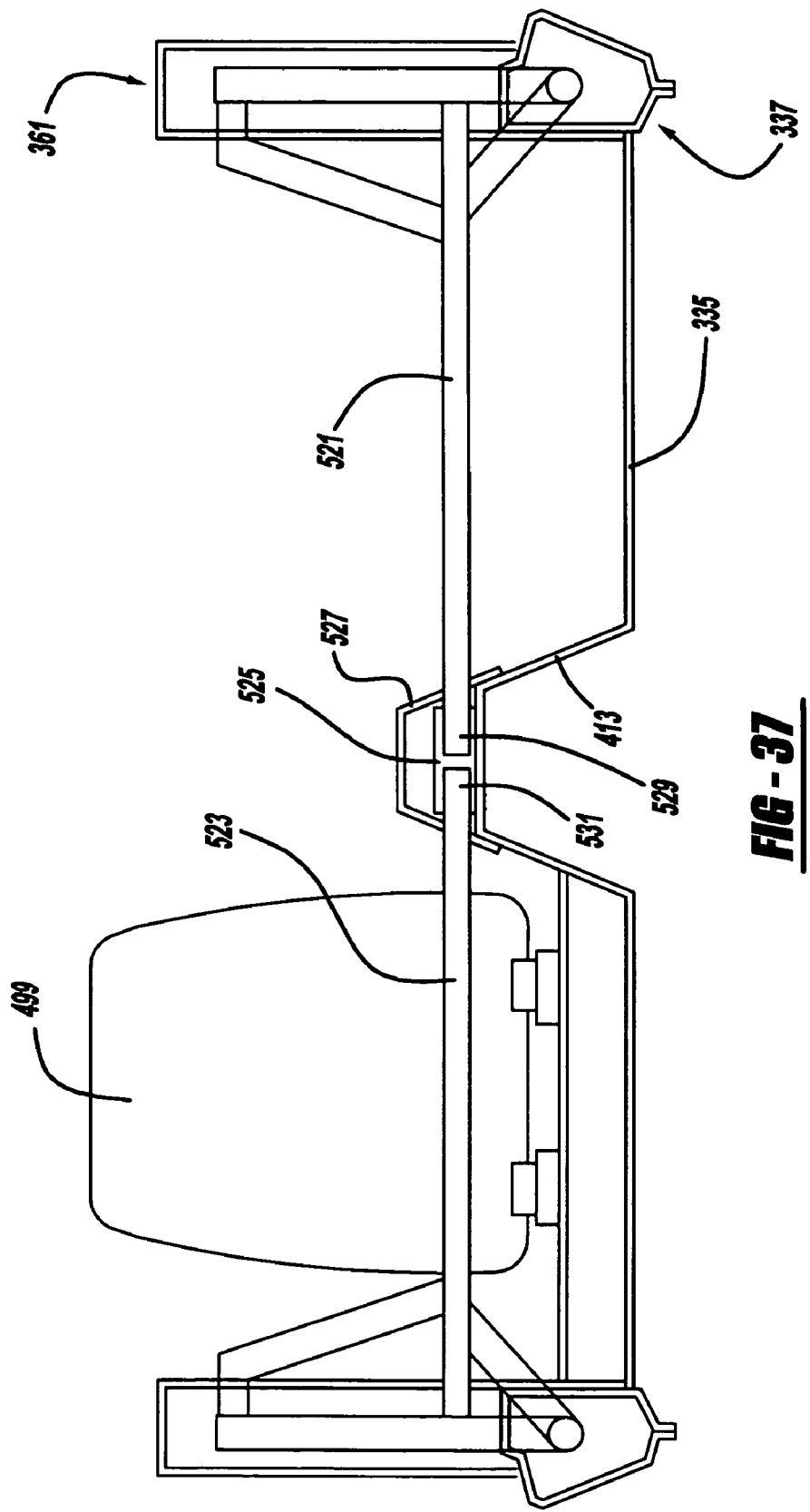
FIG. 37 is a rear, diagrammatic view showing a thirteenth alternate embodiment of the present invention structural system.
Figure 38:
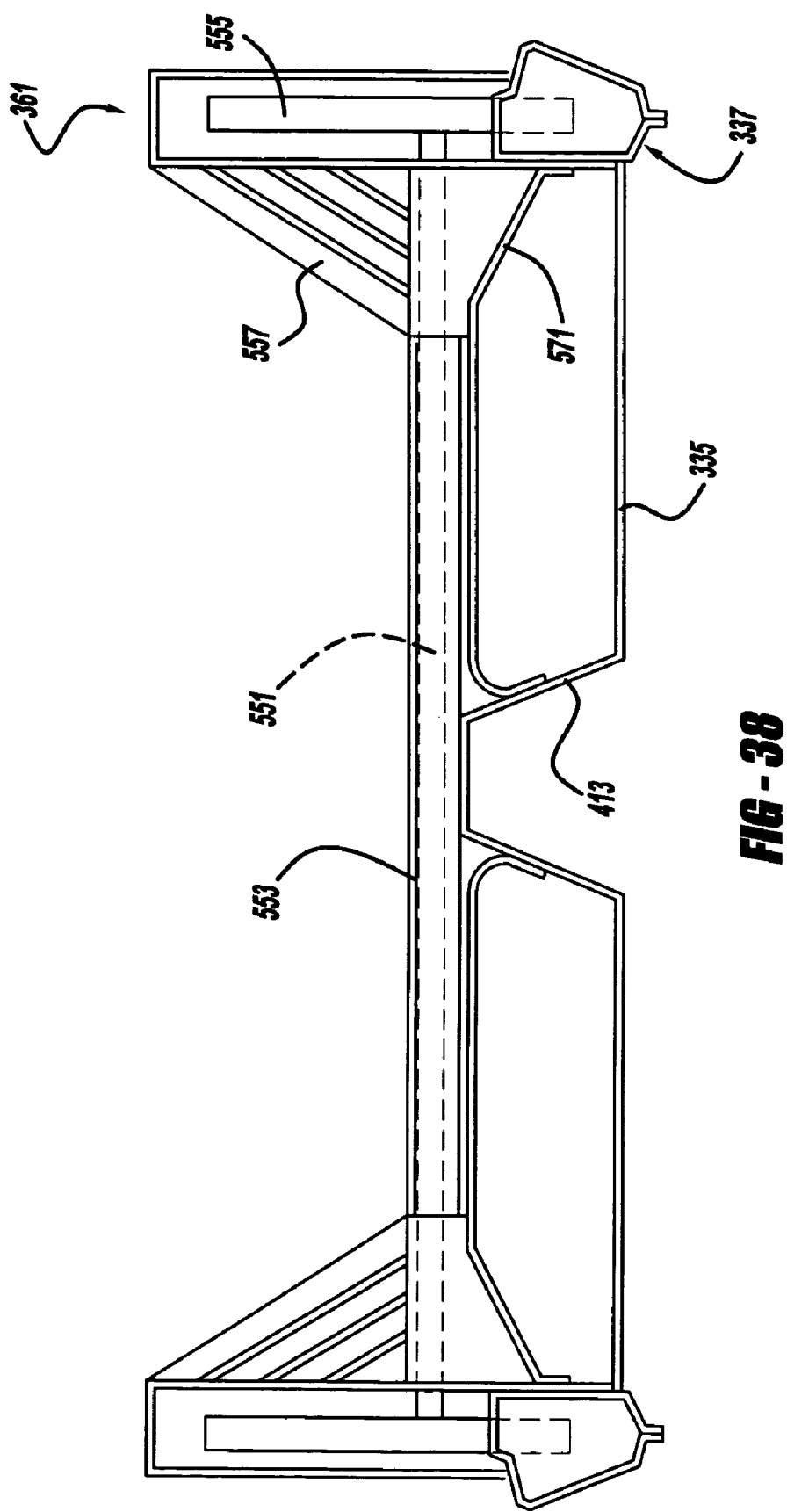
FIG. 38 is a rear, diagrammatic view showing a fourteenth alternate embodiment of the present invention structural system.
Figure 39:
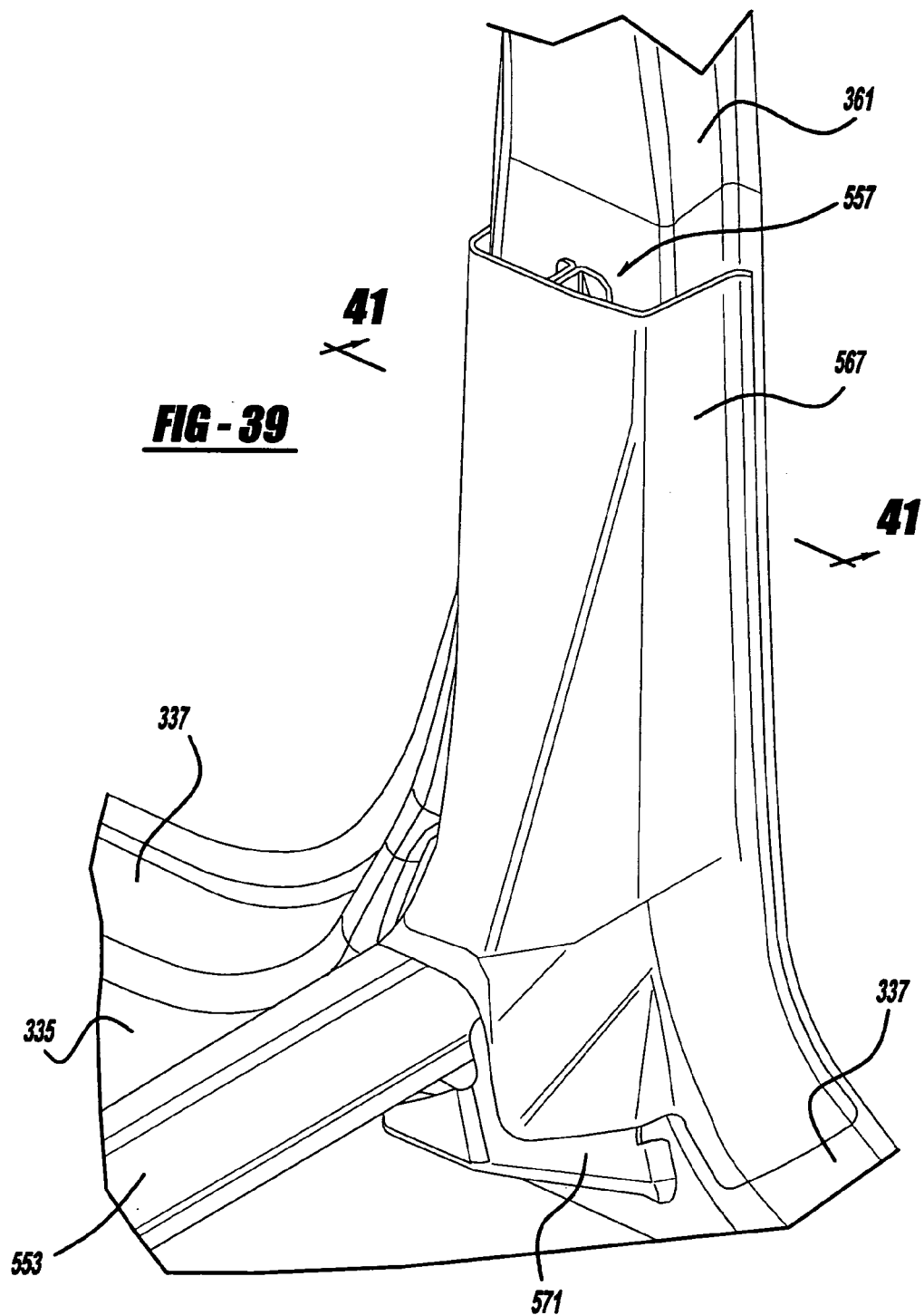
FIG. 39 is a fragmentary, perspective view showing the fourteenth alternate embodiment structural system.
Figure 40:
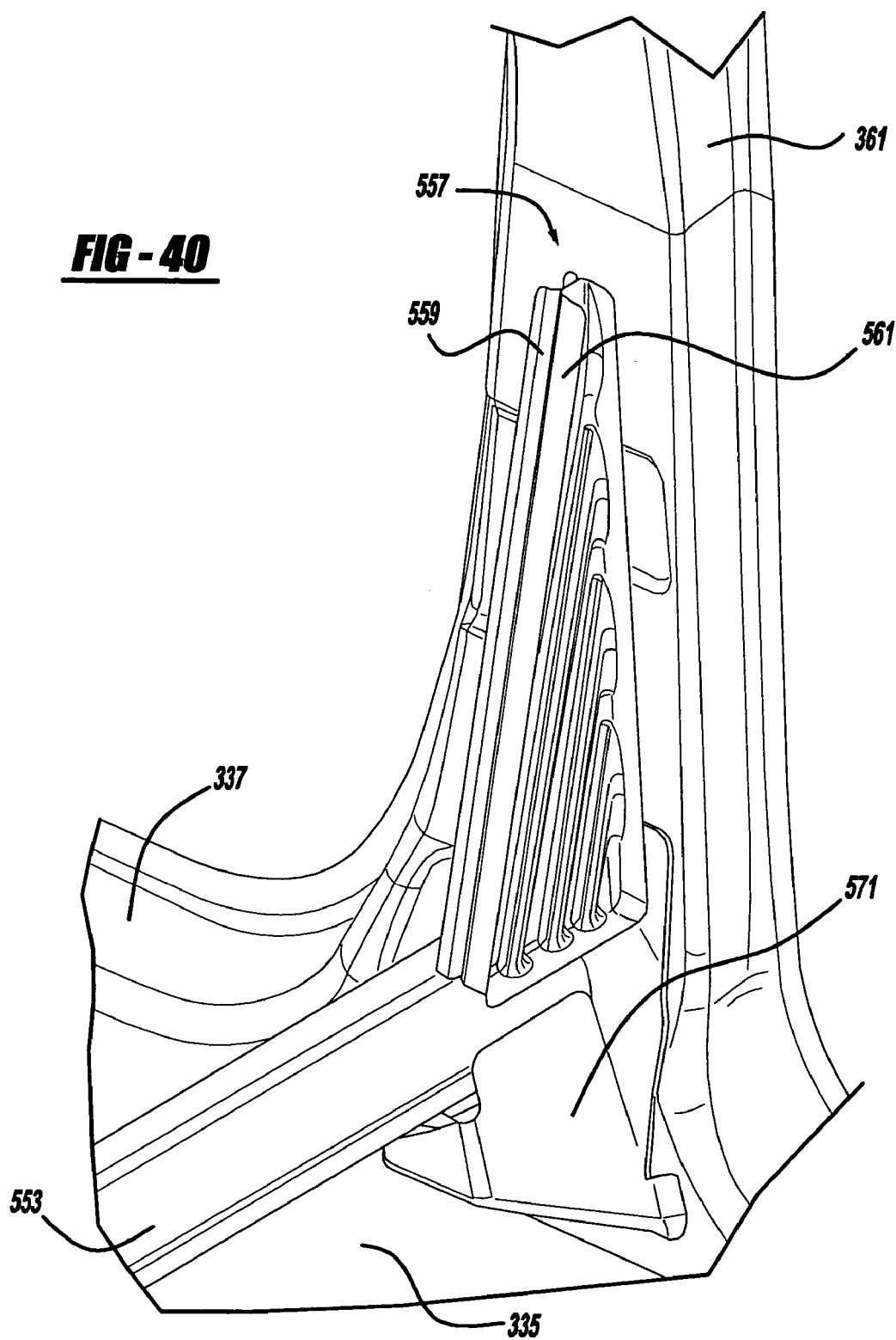
FIG. 40 is a fragmentary, perspective view, like that of FIG. 39, showing the fourteenth alternate embodiment structural system with a structural cover plate removed.
Figure 41:
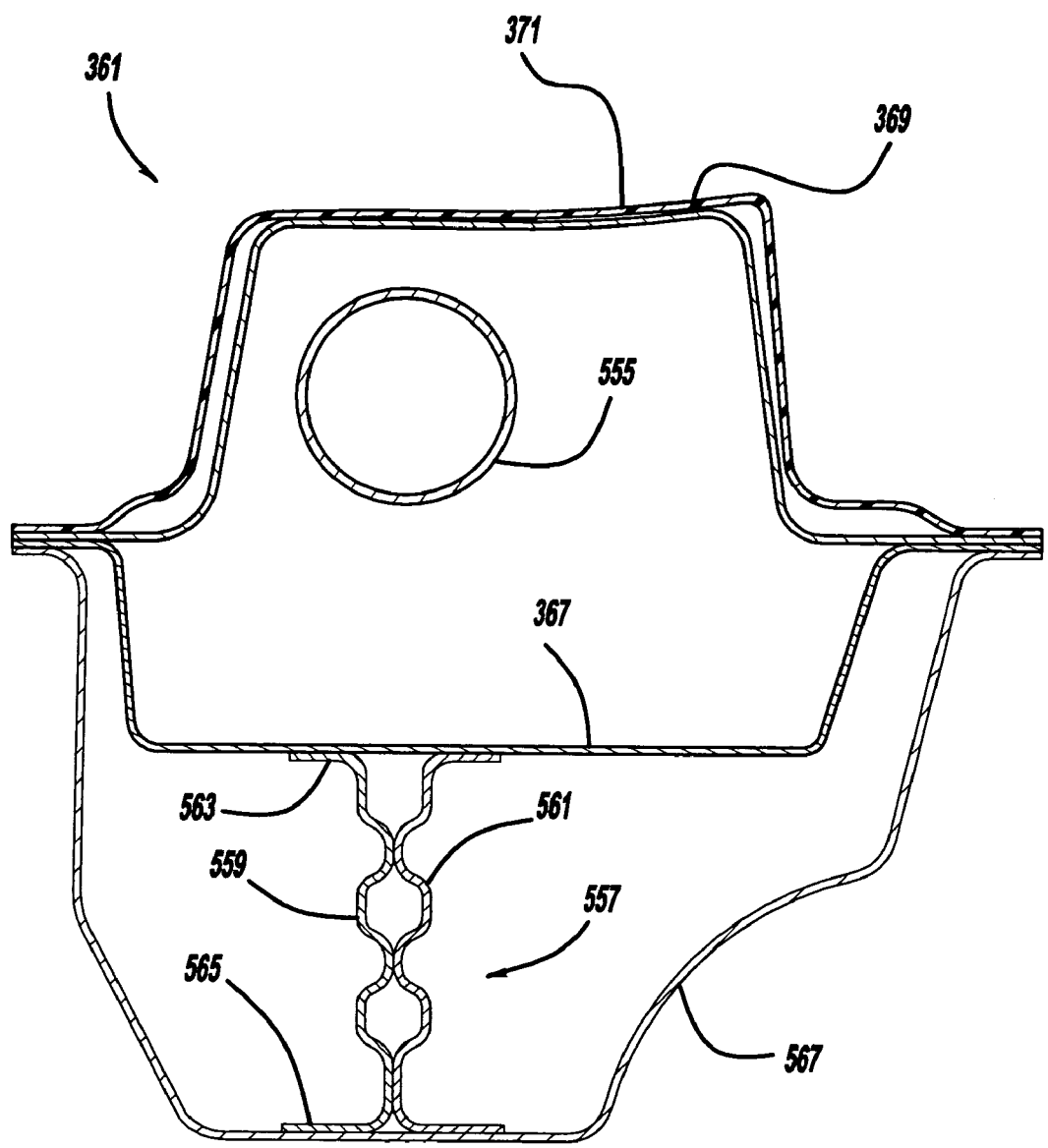
FIG. 41 is a cross-sectional view, taken along line 41-41 of FIG. 39, showing the fourteenth alternate embodiment structural system.

A thirteenth alternate embodiment is depicted in FIG. 37 wherein two coaxially aligned cross beams 521 and 523 inwardly project between B-pillars 361 and are coupled together by a circular-cylindrically shaped and hollow coupler 525. Coupler 525 is secured to floor tunnel 413 internal to a steel, floor tunnel reinforcement cap 527 attached to floor tunnel 413. Coupler 525 normally allows clearance of adjacent inboard ends 529 and 531 of cross beams 521 and 523, respectively, such that normal cross-vehicle tolerance variations and temperature induced contraction and expansion are allowed by varied end-to-end spacing of cross beams 521 and 523 within coupling 525. In a side impact situation, however, significant inward movement of the initially impacted cross beam will then cause its inboard end to abut against the opposing inboard end of the other cross beam within coupling 525, thereafter acting as a single and unitary cross beam in resisting the side impact collision.

A fourteenth preferred embodiment of the present invention structural system is illustrated in FIGS. 38-41. A structural cross beam 551 and structural outer member 553, surrounding cross beam 551 like that of the first preferred embodiment shown in FIG. 26, are used with this embodiment. Cross beam 551 is welded to vertically extending pillar reinforcement tube 555. Furthermore, a corrugated and diagonally extending, structural gusset 557 upwardly and outwardly projects from structural outer member 553 or alternately, cross beam 551, and is welded or riveted to inner panel 367 of B-pillar 361. Gusset 557 has a generally triangularly shaped configuration when viewed from the rear and includes a pair of attached corrugated and stamped steel panels 559 and 561 which are in mirrored symmetry to each other. Panels 559 and 561 have outer flanges 563 attached to the inner panel of the B-pillar, and inner flanges 565 attached to a structural, stamped steel gusset cover plate 567 (shown in FIGS. 39 and 41). The corrugations define diagonally extending ribs or flutes within each plate to add torsional stiffness. A box-like and generally diagonally extending structural gusset 571 projects from structural outer member 553 in a downward and outwardly angled manner to the bottom of center pillar 361 and rocker panel 337.

Figure 42:
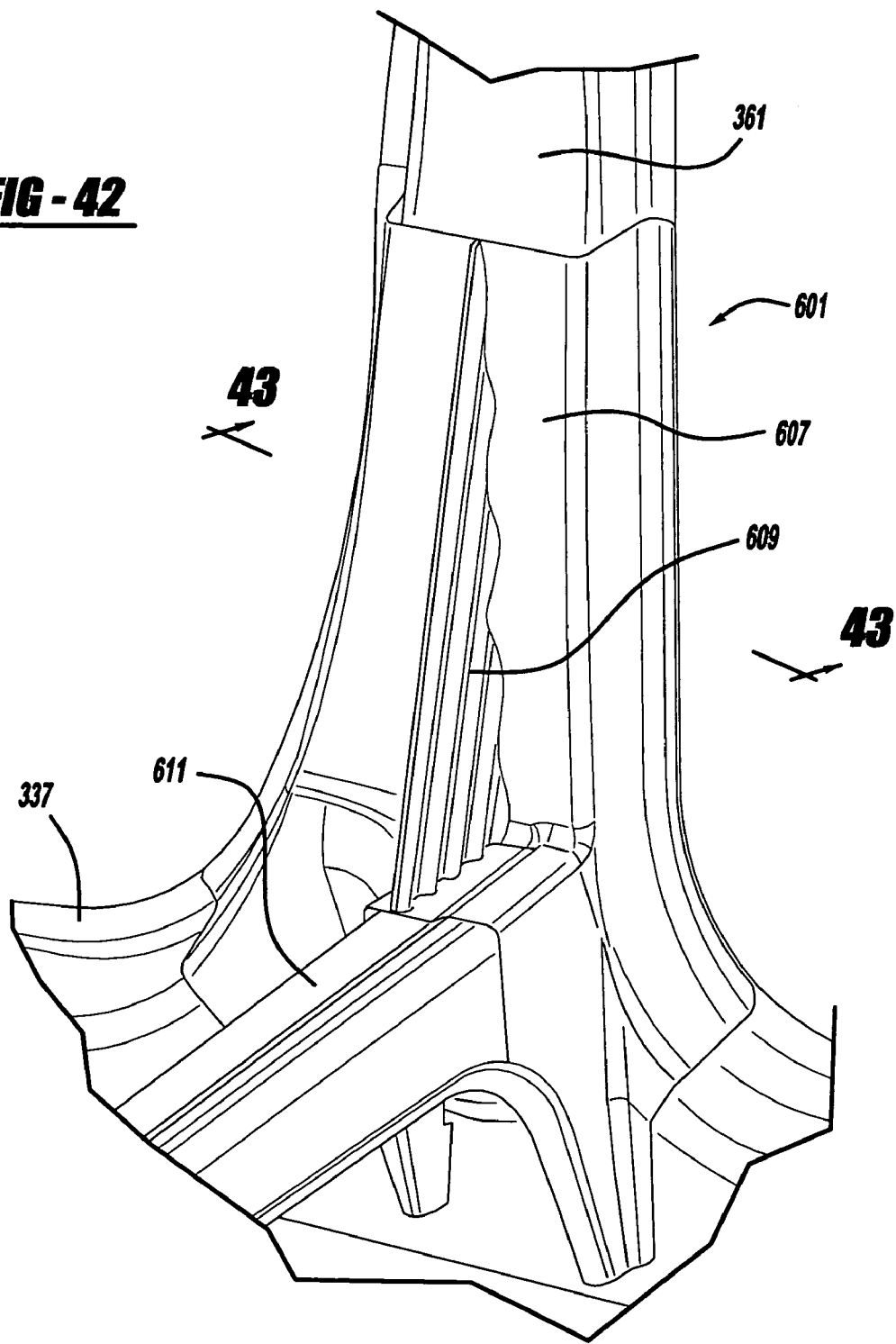
FIG. 42 is a fragmentary, perspective view showing a fifteenth alternate embodiment of the structural system of the present invention.
Figure 43:
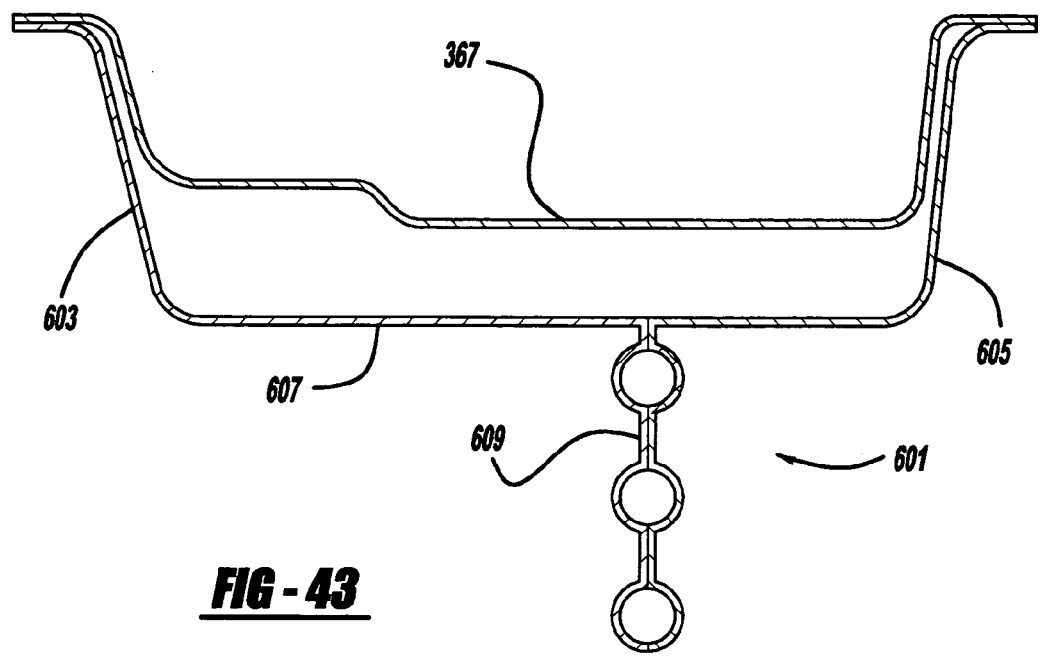
FIG. 43 is a cross-sectional view, taken along line 43-43 of FIG. 42, showing the fifteenth alternate embodiment structural system.

Referring to FIGS. 42 and 43, a fifteenth alternate embodiment structural system of the present invention is similar to the configuration employed with the prior alternate embodiment of FIGS. 38-41, except that a gusset cover plate is not employed and the upper gusset has a differing configuration. More specifically, an upper gusset 601 is defined by a pair of stamped steel gusset plates 603 and 605 which are attached to the inner panel of B-pillar 361. Gusset plates 603 and 605 are stamped in mirrored symmetry and each has a generally L-shaped pillar section 607, with an outwardly projecting pinch weld flange, and a corrugated or ribbed section 609 which defines generally circular and hollow flutes when the panels are joined together, thereby adding diagonal structural rigidity between the attached structural outer member 611 and B-pillar 361. This diagonal gusset, as well as that of the prior embodiment, are preferably covered by an aesthetically pleasing, polymeric and/or carpeted interior trim panel.

Figure 44:
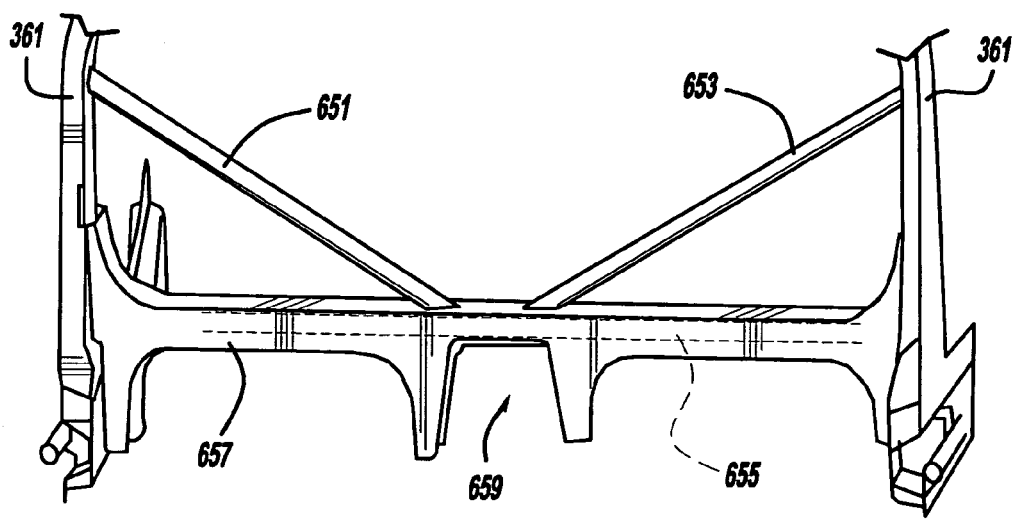
FIG. 44 is a fragmentary, rear perspective view showing a sixteenth alternate embodiment of the present invention structural system.

As shown in FIG. 44, a sixteenth alternate embodiment structural system of the present invention provides diagonally extending upper reinforcement beams 651 and 653, of a tubular configuration, which attach to either a tubular cross beam 655 and/or surrounding structural outer member 657 immediately adjacent a center, floor tunnel area 659. An upper end of each diagonal upper beam 651 and 653 attaches to a portion of each center pillar 631 adjacent beltline 61 (see FIG. 1) of the vehicle. The upper and outer end of each diagonal tube 651 and 653 may additionally or alternately be welded to a vertically extending pillar reinforcement tube.

Figure 45:
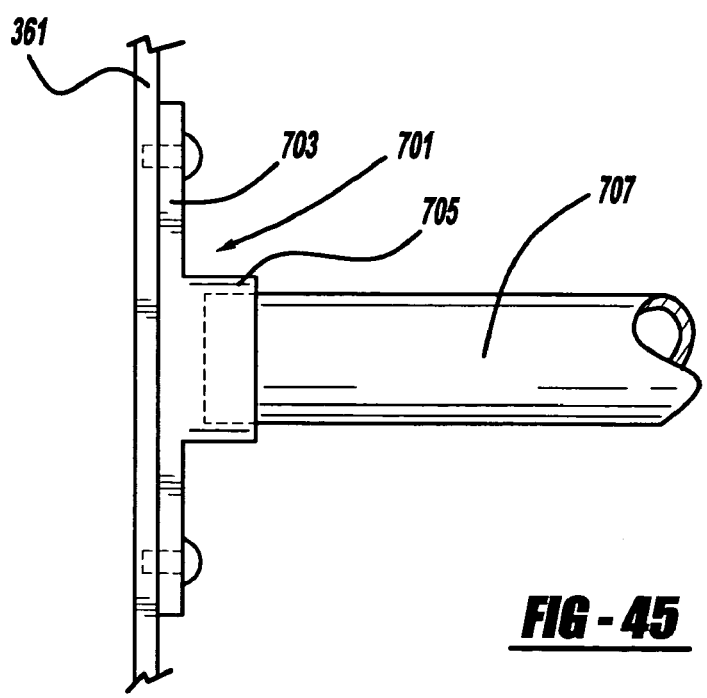
FIG. 45 is a fragmentary and diagrammatic rear view showing a seventeenth alternate embodiment of the present invention structural system.

Moreover, FIG. 45 shows a seventeenth alternate embodiment of the present invention structural system wherein an outer coupling 701 has an enlarged flange 703 screwed or riveted to an inner panel of center pillar 761. Coupling 701 also has a cylindrical and hollow collar 705 which slidably receives an outboard end of a tubular cross beam 707. Coupling 701 is configured to allow cross-vehicle movement of the secured cross beam 707 relative to pillar 361 to account for normal cross-vehicle manufacturing tolerance variations. A lost motion screw or pin fastener can optionally extend through an elongated slot in collar 705 and engage within a snug aperture in cross beam 707 to prevent complete disengagement of cross beam 707 from coupling 701 yet allow tolerance variations.

While various aspects of the structural reinforcement system have been disclosed, it should be appreciated that variations may be made which fall within the scope of the present invention. For example, additional accessories can be attached to any of the structural reinforcement beams disclosed herein such as folding tables, lamps, telephones, computers and the like. Furthermore, the beams can alternately be manufactured from composite materials such as glass-filled polymers, metal inserts molded within polymers, and the like. The cross-vehicle beams and reinforcements can also be employed behind rear seats, in front of instrument panels or between other vehicle pillars although various advantageous of the present invention may not be fully achieved. Structural system 19 is preferably employed in a convertible vehicle having four, side passenger doors 213 but may also be used in a stretch limousine having four or more passenger doors and a stationary roof. Bullet-proof armor is optionally mounted along a cross-car plane parallel and internal to trim panels 105. Furthermore, it should be appreciated that alternate beam shapes can be employed. It is intended by the following claims to cover these and any other departures from the disclosed embodiments that fall within the true spirit of the invention.

The invention claimed is:

1. An automotive vehicle comprising:
   a body having a front seating area with a front seat and a rear seating area with a rear seat;
   at least one front passenger door opening positioned to allow access to the front seating area;
   at least one rear passenger door opening positioned to allow access to the rear seating area;
   a convertible roof movable from a raised position, covering at least one of the seating areas, to a retracted position; and
   a structural reinforcement beam extending in a substantially cross-vehicle direction substantially between the seating areas, the structural beam having end sections and a middle section, the middle section being straight and substantially horizontal, the front seat being movable independent of the structural beam.

2. The automotive vehicle of claim 1 further comprising:
   a substantially vertical body pillar; and
   a first diagonal beam downwardly extending from a lower side of the structural reinforcement beam to the body pillar.

3. The automotive vehicle apparatus of claim 2 further comprising a second diagonal beam upwardly extending from an upper side of the structural reinforcement beam to the body pillar.

4. The automotive vehicle of claim 1 wherein the convertible roof further comprises:
   an automatic actuator;
   roof rails and roof bows operably movable by the actuator; and
   a pliable roof cover attached to the roof bows.

5. The automotive vehicle of claim 1 wherein the convertible roof further comprises:
   an automatic actuator; and
   at least one hard-top roof panel operably movable by the actuator.

6. The automotive vehicle of claim 1 further comprising a structural rocker panel attached to the structural beam.

7. The automotive vehicle of claim 1 further comprising a central floor tunnel attached to the structural beam.

8. The automotive vehicle of claim 1 further comprising a corrugated gusset diagonally extending from the structural beam.

9. The automotive vehicle of claim 1 further comprising a vehicle floor, wherein at least a majority of the structural beam is spaced above the floor.

10. An automotive vehicle comprising:
    a front passenger door opening;
    a rear passenger door opening;
    a vehicle floor;
    a structural pillar substantially vertically extending between the front and rear door openings, the pillar including a structural outer panel joined to a structural inner panel to create an elongated hollow cavity therebetween;
    an elongated pillar reinforcement securely affixed within the cavity of the pillar and defining an enclosed, cross-sectional shape;
    a structural beam extending in a substantially cross-vehicle direction having an end coupled to the pillar reinforcement, at least a majority of the structural beam being spaced above the floor with foot room clearance between the structural beam and the floor; and
    a first diagonal beam upwardly extending from an upper side of the structural beam adjacent the pillar.

11. The automotive vehicle of claim 10 further comprising a second diagonal beam downwardly extending from a lower side of the structural beam adjacent the pillar, the diagonal beams being coupled to at least one of the pillar and the pillar reinforcement.

12. The automotive vehicle of claim 10 wherein the structural beam is substantially straight between a central tunnel and the pillar.

13. The automotive vehicle of claim 10 wherein the first diagonal beam couples the structural beam to the pillar reinforcement.

14. The automotive vehicle of claim 10 wherein the first diagonal beam includes a corrugated gusset diagonally extending between the structural beam and the pillar.

15. The automotive vehicle of claim 10 further comprising a convertible roof movable from a raised position covering a passenger seating area to a retracted position behind the passenger seating area.

16. An automotive vehicle comprising:
a front passenger door opening;
a rear passenger door opening;
a vehicle floor;
a structural pillar substantially vertically extending between the front and rear door openings, the pillar including a structural outer panel joined to a structural inner panel to create an elongated hollow cavity therebetween;
an elongated pillar reinforcement securely affixed within the cavity of the pillar and defining an enclosed, cross-sectional shape;
a structural beam extending in a substantially cross-vehicle direction having an end coupled to the pillar reinforcement, at least a majority of the structural beam being spaced above the floor with foot room clearance between the structural beam and the floor;
a structural rocker panel extending in a substantially fore-and-aft vehicular direction, the pillar being affixed to the rocker panel;
a rocker reinforcement affixed inside of the rocker panel and extending substantially in a parallel and elongated direction aligned with the rocker panel, the pillar reinforcement being affixed to the rocker reinforcement; and
a diagonal beam coupling the structural beam to the rocker reinforcement.

17. The automotive vehicle of claim 16 further comprising a raised vehicle floor tunnel, the structural beam being straight between its ends and attaching to the floor tunnel.

18. The automotive vehicle of claim 16 further comprising a convertible roof movable from a raised position to a retracted position substantially below a plane defined by a vehicular beltline.

19. An automotive vehicle comprising:
a front passenger door opening;
a rear passenger door opening;
a vehicle floor;
a structural pillar substantially vertically extending between the front and rear door openings, the pillar including a structural outer panel joined to a structural inner panel to create an elongated hollow cavity therebetween;
an elongated pillar reinforcement securely affixed within the cavity of the pillar and defining an enclosed, cross-sectional shape; and
a structural beam extending in a substantially cross-vehicle direction having an end coupled to the pillar reinforcement, at least a majority of the structural beam being spaced above the floor with foot room clearance between the structural beam and the floor;
wherein the pillar reinforcement and the structural beam both have substantially circular cross-sectional shapes.

20. The automotive vehicle of claim 19 further comprising a first diagonal beam upwardly extending from an upper side of the structural beam adjacent the pillar.

21. A method of manufacturing an automotive vehicle having a front door opening, a rear door opening, a structural pillar, a structural floor, a first elongated structural beam and a second elongated structural beam, the method comprising:
(a) positioning the pillar between the front and rear door openings;
(b) attaching the first beam in a substantially cross-vehicle elongated direction;
(c) structurally attaching the first beam to and aligned with the pillar;
(d) spacing at least a majority of the first beam above the floor to allow foot room clearance;
(e) attaching the second structural beam to extend in a substantially cross-vehicle elongated direction substantially aligned with the pillar; and
(f) attaching a structural member to at least one of the beams wherein the structural member upwardly and outwardly couples the beam to the pillar.

22. The method of claim 21 further comprising attached a convertible roof to the vehicle.

23. The method of claim 22 further comprising making and assembling the beams to assist the vehicle in satisfactorily passing Federal Motor Vehicle Safety Standard side impact test 214.

24. The method of claim 21 further comprising attaching at least one of the beams to a fore-and-aft elongated and raised floor tunnel.

25. A method of manufacturing an automotive vehicle having a front door opening, a rear door opening, a structural pillar, a structural floor, a first elongated structural beam and a second elongated structural beam, the method comprising:
(a) positioning the pillar between the front and rear door openings;
(b) attaching the first beam in a substantially cross-vehicle elongated direction;
(c) structurally attaching the first beam to and aligned with the pillar;
(d) spacing at least a majority of the first beam above the floor to allow foot room clearance;
(e) attaching the second structural beam to extend in a substantially cross-vehicle elongated direction substantially aligned with the pillar; and
(f) locating the beams closer to the floor than to a beltline of the vehicle.

26. The method of claim 25 further comprising attaching a structural member to at least one of the beams wherein the structural member upwardly and outwardly couples the beam to the pillar.

27. The method of claim 25 further comprising attached a convertible roof to the vehicle.

28. The method of claim 25 further comprising attaching at least one of the beams to a fore-and-aft elongated and raised floor tunnel.

29. The method of claim 25 further comprising making and assembling the beams to assist the vehicle in satisfactorily passing Federal Motor Vehicle Safety Standard side impact test 214.

30. A method of manufacturing an automotive vehicle having a front door opening, a rear door opening, a structural pillar, a structural floor, a first elongated structural beam and a second elongated structural beam, the method comprising:
(a) positioning the pillar between the front and rear door openings;
(b) attaching the first beam in a substantially cross-vehicle elongated direction;
(c) structurally attaching the first beam to and aligned with the pillar;
(d) spacing at least a majority of the first beam above the floor to allow foot room clearance;

(e) attaching the second structural beam to extend in a substantially cross-vehicle elongated direction substantially aligned with the pillar; and
(f) locating at least a majority of the first beam inside the second beam.

31. The method of claim 30 further comprising attached a convertible roof to the vehicle.

32. The method of claim 30 further comprising attaching at least one of the beams to a fore-and-aft elongated and raised floor tunnel.

33. The method of claim 30 further comprising making and assembling the beams to assist the vehicle in satisfactorily passing Federal Motor Vehicle Safety Standard side impact test 214.

34. A method of manufacturing an automotive vehicle having a front door opening, a rear door opening, a structural pillar, a structural floor, a first elongated structural beam and a second elongated structural beam, the method comprising:
(a) positioning the pillar between the front and rear door openings;
(b) attaching the first beam in a substantially cross-vehicle elongated direction;
(c) structurally attaching the first beam to and aligned with the pillar;
(d) spacing at least a majority of the first beam above the floor to allow foot room clearance;
(e) attaching the second structural beam to extend in a substantially cross-vehicle elongated direction substantially aligned with the pillar; and
(f) making the beams of different cross-sectional shapes.

35. The method of claim 34 further comprising providing a convertible roof for the vehicle.

36. The method of claim 34 further comprising attaching at least one of the beams to a fore-and-aft elongated and raised floor tunnel.

37. The method of claim 34 further comprising making and assembling the beams to assist the vehicle in satisfactorily passing Federal Motor Vehicle Safety Standard side impact test 214.

38. A method of manufacturing an automotive vehicle having a front door opening, a rear door opening, a structural pillar, a structural floor and an elongated structural beam, the method comprising:
(a) positioning the pillar between the front and rear door openings;
(b) attaching the beam in a substantially cross-vehicle elongated direction;
(c) structurally attaching the beam to the pillar;
(d) attaching a convertible roof to the vehicle; and
(e) making and assembling the beam to assist the vehicle in satisfactorily passing Federal Motor Vehicle Safety Standard side impact test 214.

39. The method of claim 38 further comprising locating at least a majority of a second beam inside the structural beam.

40. The method of claim 39 further comprising making the beams of different cross-sectional shapes.

41. The method of claim 38 further comprising attaching a structural member to the beam wherein the structural member upwardly and outwardly couples the beam to the pillar in a diagonal manner.

42. The method of claim 38 further comprising manufacturing the convertible roof for the vehicle, the convertible roof being a soft-top roof including a pliable cover and movable roof bows.

43. A method of manufacturing an automotive vehicle having a front door opening, a rear door opening, a structural B-pillar, a structural floor, a first elongated structural beam and a convertible roof, the method comprising:
(a) making the convertible roof and attaching it to the vehicle;
(b) attaching the beam in a substantially cross-vehicle elongated direction;
(c) structurally attaching the beam to the B-pillar;
(d) spacing at least a majority of the beam above the floor to allow foot room clearance; and
(e) assembling the beam to assist the vehicle in satisfactorily passing Federal Motor Vehicle Safety Standard side impact test 214.

44. The method of claim 43 further comprising locating at least a majority of a second structural beam inside the first beam.

45. The method of claim 43 further comprising locating the first beam closer to the floor than to a vehicular beltline.

46. The method of claim 43 further comprising attaching the beam to a fore-and-aft elongated and raised floor tunnel.

47. An automotive vehicle comprising:
a front passenger door opening;
a rear passenger door opening;
a vehicle floor;
a structural pillar substantially vertically extending between the front and rear door openings;
a first structural beam extending in a substantially cross-vehicle direction and being coupled to the pillar, at least a majority of the first structural beam being spaced above the floor with foot room clearance between the first structural beam and the floor, and at least a majority of the first structural beam being located closer to the floor than to a vehicular beltline; and
at least a majority of a second elongated structural beam being located inside of the first structural beam.

48. The automotive vehicle of claim 47 further comprising a first diagonal beam upwardly extending from an upper side of at least one of the structural beams adjacent the pillar.

49. The automotive vehicle of claim 47 further comprising a second diagonal beam downwardly extending from a lower side of at least one of the structural beams adjacent the pillar, the diagonal beams being coupled to the pillar.

50. The automotive vehicle of claim 47 wherein at least one of the structural beams is substantially straight between a central tunnel and the pillar.

51. The automotive vehicle of claim 47 further comprising a bracket coupling the beam to a pillar reinforcement located inside the pillar.

52. The automotive vehicle of claim 47 further comprising a corrugated gusset diagonally extending between at least one of the structural beams and the pillar.

53. The automotive vehicle of claim 47 further comprising a convertible roof movable from a raised position covering a passenger seating area to a retracted position behind the passenger seating area.

54. The automotive vehicle of claim 47 further comprising a structural rocker panel extending in a substantially fore-and-aft vehicular direction, the pillar being affixed to the rocker panel, a rocker reinforcement being affixed inside of the rocker panel and extending substantially in a parallel and elongated direction aligned with the rocker panel, a pillar reinforcement being affixed to the rocker reinforcement and a diagonal beam coupling at least one of the structural beams to the rocker reinforcement.

* * * * *